United States Patent
Harang et al.

(10) Patent No.: US 12,437,239 B2
(45) Date of Patent: Oct. 7, 2025

(54) METHODS AND APPARATUS FOR MANAGEMENT OF A MACHINE-LEARNING MODEL TO ADAPT TO CHANGES IN LANDSCAPE OF POTENTIALLY MALICIOUS ARTIFACTS

(71) Applicant: Sophos Limited, Abingdon (GB)

(72) Inventors: Richard Harang, Alexandria, VA (US); Felipe Ducau, Oxford (GB)

(73) Assignee: Sophos Limited, Abingdon (GB)

(*) Notice: Subject to any disclaimer, the term of this patent is extended or adjusted under 35 U.S.C. 154(b) by 1262 days.

(21) Appl. No.: 17/168,913

(22) Filed: Feb. 5, 2021

(65) Prior Publication Data
US 2021/0241175 A1     Aug. 5, 2021

Related U.S. Application Data

(63) Continuation of application No. PCT/GB2019/052222, filed on Aug. 7, 2019.
(Continued)

(51) Int. Cl.
*G06N 20/00* (2019.01)
*G06F 18/21* (2023.01)
(Continued)

(52) U.S. Cl.
CPC ........... *G06N 20/20* (2019.01); *G06F 18/213* (2023.01); *G06F 18/214* (2023.01);
(Continued)

(58) Field of Classification Search
CPC .......... G06N 20/20; G06N 20/00; G06N 5/01; G06F 18/2178; G06F 18/22; G06F 18/214; G06F 18/213; G11B 20/10379
See application file for complete search history.

(56) References Cited

U.S. PATENT DOCUMENTS

| 7,069,589 B2 | 6/2006 | Schmall et al. |
| 7,204,152 B2 | 4/2007 | Woodward et al. |

(Continued)

FOREIGN PATENT DOCUMENTS

| BR | 102018077168 A2 * | 12/2019 | ............. G06N 3/006 |
| CA | 2799691 C | 9/2014 | |

(Continued)

OTHER PUBLICATIONS

U.S. Appl. No. 15/907,807, Office Action mailed Apr. 27, 2021, 18 pages.
(Continued)

*Primary Examiner* — Steven P Sax
(74) *Attorney, Agent, or Firm* — COOLEY LLP

(57) ABSTRACT

An apparatus can include a memory and a processor. The processor can be configured to train a machine-learning (ML) model to output (1) an identification of whether an artifact is malicious and (2) a confidence value associated with the identification of whether the artifact is malicious. The processor can further be configured to receive a set of artifacts during a set of time periods, and provide a representation of each artifact from the set of artifacts to obtain as an output of the ML model including an indication of whether that artifact is malicious and a confidence value associated with the indication. The processor can be further configured to calculate a confidence metric for each time period based on the confidence value associated with each artifact and send an indication to retrain the ML model based on the confidence metric for at least one time period meeting a retraining criterion.

14 Claims, 7 Drawing Sheets

Related U.S. Application Data

(60) Provisional application No. 62/715,762, filed on Aug. 7, 2018.

(51) Int. Cl.
| | | |
|---|---|---|
| *G06F 18/213* | (2023.01) | |
| *G06F 18/214* | (2023.01) | |
| *G06F 18/22* | (2023.01) | |
| *G06N 5/01* | (2023.01) | |
| *G06N 20/20* | (2019.01) | |

(52) U.S. Cl.
CPC .......... *G06F 18/2178* (2023.01); *G06F 18/22* (2023.01); *G06N 5/01* (2023.01); *G06N 20/00* (2019.01)

(56) References Cited

U.S. PATENT DOCUMENTS

| | | | |
|---|---|---|---|
| 7,219,148 | B2 | 5/2007 | Rounthwaite et al. |
| 7,545,986 | B2 | 6/2009 | Bachmann |
| 7,558,832 | B2 | 7/2009 | Rounthwaite et al. |
| 7,711,663 | B2 | 5/2010 | Weng |
| 7,769,772 | B2 | 8/2010 | Weyl et al. |
| 7,934,103 | B2 | 4/2011 | Kidron |
| 8,413,244 | B1* | 4/2013 | Nachenberg .......... H04L 63/145 714/48 |
| 8,458,794 | B1 | 6/2013 | Sallam |
| 8,635,700 | B2 | 1/2014 | Richard et al. |
| 8,709,924 | B2 | 4/2014 | Hanawa et al. |
| 9,189,730 | B1 | 11/2015 | Coenen et al. |
| 9,404,833 | B2 | 8/2016 | Stadlbauer et al. |
| 9,465,940 | B1 | 10/2016 | Wojnowicz et al. |
| 9,514,391 | B2 | 12/2016 | Perronnin et al. |
| 9,531,742 | B2 | 12/2016 | Kohout et al. |
| 9,672,358 | B1 | 6/2017 | Long et al. |
| 9,680,868 | B2 | 6/2017 | Bailey et al. |
| 9,690,938 | B1 | 6/2017 | Saxe et al. |
| 9,721,097 | B1 | 8/2017 | Davis et al. |
| 9,792,492 | B2 | 10/2017 | Soldevila et al. |
| 9,807,113 | B2 | 10/2017 | Yang et al. |
| 9,864,956 | B1 | 1/2018 | Sai |
| 10,015,150 | B2 | 7/2018 | Basin |
| 10,193,902 | B1 | 1/2019 | Caspi |
| 10,380,498 | B1* | 8/2019 | Chaoji ...................... G06N 7/01 |
| 10,521,587 | B1 | 12/2019 | Agranonik et al. |
| 10,599,844 | B2 | 3/2020 | Schmidtler et al. |
| 10,635,813 | B2 | 4/2020 | Saxe et al. |
| 10,742,591 | B2 | 8/2020 | Nguyen et al. |
| 10,834,128 | B1 | 11/2020 | Rajagopalan et al. |
| 10,924,503 | B1* | 2/2021 | Pereira ................... H04L 63/20 |
| 10,956,477 | B1 | 3/2021 | Fang et al. |
| 11,003,774 | B2 | 5/2021 | Saxe et al. |
| 11,063,881 | B1 | 7/2021 | Vijayasuganthan et al. |
| 11,069,082 | B1 | 7/2021 | Ebrahimi Afrouzi et al. |
| 11,170,104 | B1* | 11/2021 | Stickle .................. G06N 20/00 |
| 11,188,649 | B2* | 11/2021 | Chistyakov ............ G06N 5/025 |
| 11,270,205 | B2 | 3/2022 | Harang |
| 11,321,607 | B2 | 5/2022 | Shah et al. |
| 11,409,869 | B2 | 8/2022 | Schmidtler et al. |
| 11,568,301 | B1* | 1/2023 | Yueh ..................... G06N 20/00 |
| 11,574,052 | B2 | 2/2023 | Harang |
| 11,609,991 | B2 | 3/2023 | Saxe et al. |
| 11,620,713 | B2* | 4/2023 | Ashly .................... G06Q 10/10 705/4 |
| 11,663,602 | B2* | 5/2023 | Hindi .................... G06N 5/043 706/15 |
| 11,822,374 | B2 | 11/2023 | Saxe et al. |
| 11,941,491 | B2 | 3/2024 | Harang et al. |
| 11,947,668 | B2 | 4/2024 | Harang |
| 11,961,410 | B1* | 4/2024 | Lin ....................... H04N 5/2621 |
| 12,010,129 | B2 | 6/2024 | Vörös et al. |
| 12,248,572 | B2 | 3/2025 | Saxe et al. |
| 2006/0013475 | A1 | 1/2006 | Philomin et al. |
| 2008/0025208 | A1 | 1/2008 | Chan |
| 2009/0003264 | A1 | 1/2009 | Sastry |
| 2009/0122718 | A1 | 5/2009 | Klessig et al. |
| 2009/0254992 | A1 | 10/2009 | Schultz et al. |
| 2009/0300765 | A1 | 12/2009 | Moskovitch et al. |
| 2013/0067579 | A1 | 3/2013 | Beveridge et al. |
| 2014/0090061 | A1 | 3/2014 | Avasarala et al. |
| 2014/0143869 | A1 | 5/2014 | Pereira et al. |
| 2015/0046850 | A1 | 2/2015 | Kurabayashi et al. |
| 2015/0067853 | A1 | 3/2015 | Amrutkar et al. |
| 2015/0213376 | A1 | 7/2015 | Ideses et al. |
| 2015/0363294 | A1 | 12/2015 | Carback, III et al. |
| 2016/0065597 | A1 | 3/2016 | Nguyen et al. |
| 2016/0217368 | A1 | 7/2016 | Ioffe et al. |
| 2016/0218933 | A1 | 7/2016 | Porras et al. |
| 2016/0253500 | A1 | 9/2016 | Alme et al. |
| 2017/0046616 | A1 | 2/2017 | Socher et al. |
| 2017/0078317 | A1 | 3/2017 | Gertner et al. |
| 2017/0092264 | A1 | 3/2017 | Hakkani-Tur et al. |
| 2017/0109615 | A1 | 4/2017 | Yatziv et al. |
| 2017/0212829 | A1 | 7/2017 | Bales et al. |
| 2017/0227995 | A1* | 8/2017 | Lee ......................... G06N 20/00 |
| 2017/0351948 | A1 | 12/2017 | Lee et al. |
| 2017/0372071 | A1 | 12/2017 | Saxe et al. |
| 2018/0004803 | A1 | 1/2018 | Hao et al. |
| 2018/0053084 | A1 | 2/2018 | Li et al. |
| 2018/0060580 | A1 | 3/2018 | Zhao et al. |
| 2018/0101682 | A1 | 4/2018 | Krukov et al. |
| 2018/0121802 | A1 | 5/2018 | Ruckauer et al. |
| 2018/0129786 | A1 | 5/2018 | Khine |
| 2018/0137642 | A1 | 5/2018 | Malisiewicz et al. |
| 2018/0144242 | A1 | 5/2018 | Simard |
| 2018/0152471 | A1 | 5/2018 | Jakobsson |
| 2018/0198812 | A1* | 7/2018 | Christodorescu ... H04L 63/1425 |
| 2018/0211041 | A1 | 7/2018 | Davis |
| 2018/0268304 | A1* | 9/2018 | Manadhata .............. G06N 5/04 |
| 2018/0285740 | A1 | 10/2018 | Smyth et al. |
| 2018/0285773 | A1 | 10/2018 | Hsiao et al. |
| 2018/0288086 | A1 | 10/2018 | Amiri et al. |
| 2018/0293381 | A1 | 10/2018 | Tseng et al. |
| 2019/0026106 | A1* | 1/2019 | Burton ...................... G06F 8/71 |
| 2019/0065744 | A1 | 2/2019 | Gaustad |
| 2019/0095805 | A1 | 3/2019 | Tristan |
| 2019/0108338 | A1 | 4/2019 | Saxe et al. |
| 2019/0132355 | A1 | 5/2019 | Egbert et al. |
| 2019/0205402 | A1 | 7/2019 | Sernau et al. |
| 2019/0236273 | A1 | 8/2019 | Saxe et al. |
| 2019/0236490 | A1 | 8/2019 | Harang et al. |
| 2019/0258807 | A1 | 8/2019 | DiMaggio et al. |
| 2019/0266492 | A1 | 8/2019 | Harang et al. |
| 2019/0295114 | A1 | 9/2019 | Pavletic et al. |
| 2019/0319987 | A1* | 10/2019 | Levy ....................... G06F 16/93 |
| 2019/0347287 | A1 | 11/2019 | Crossno et al. |
| 2019/0378050 | A1 | 12/2019 | Edkin et al. |
| 2019/0387005 | A1 | 12/2019 | Zawoad et al. |
| 2020/0076835 | A1* | 3/2020 | Ladnai ............... G06Q 10/0635 |
| 2020/0097817 | A1 | 3/2020 | Harris et al. |
| 2020/0104636 | A1 | 4/2020 | Halevi et al. |
| 2020/0117975 | A1 | 4/2020 | Harang et al. |
| 2020/0228998 | A1 | 7/2020 | Bai et al. |
| 2020/0233962 | A1* | 7/2020 | Chantry .................... G06F 8/311 |
| 2020/0250309 | A1 | 8/2020 | Harang et al. |
| 2020/0257799 | A1 | 8/2020 | Saxe et al. |
| 2020/0279140 | A1* | 9/2020 | Pai ...................... G06F 11/3447 |
| 2020/0285737 | A1* | 9/2020 | Kraus .................... G06F 21/552 |
| 2020/0311586 | A1 | 10/2020 | Sandstrom |
| 2020/0342337 | A1 | 10/2020 | Choudhary et al. |
| 2020/0394300 | A1* | 12/2020 | Harris .................... G06F 21/575 |
| 2021/0014247 | A1 | 1/2021 | Wosotowsky et al. |
| 2021/0073377 | A1 | 3/2021 | Coull et al. |
| 2021/0073661 | A1 | 3/2021 | Matlick et al. |
| 2021/0092140 | A1 | 3/2021 | Kazerounian et al. |
| 2021/0093973 | A1 | 4/2021 | Edridge et al. |
| 2021/0120013 | A1 | 4/2021 | Hines et al. |
| 2021/0168165 | A1 | 6/2021 | Alsaeed et al. |
| 2021/0211450 | A1 | 7/2021 | Aleidan |
| 2021/0287354 | A1 | 9/2021 | Kumar et al. |
| 2021/0326440 | A1 | 10/2021 | Saxe et al. |
| 2021/0328801 | A1 | 10/2021 | Sly et al. |
| 2021/0328969 | A1 | 10/2021 | Gaddam et al. |

(56) References Cited

U.S. PATENT DOCUMENTS

| | | |
|---|---|---|
| 2021/0397956 A1 | 12/2021 | Rasamsetti et al. |
| 2022/0036194 A1 | 2/2022 | Sundaresan et al. |
| 2022/0083662 A1 | 3/2022 | Grobman et al. |
| 2022/0083900 A1 | 3/2022 | Khanna |
| 2022/0124543 A1 | 4/2022 | Orhan et al. |
| 2022/0284283 A1 | 9/2022 | Yin et al. |
| 2022/0353284 A1 | 11/2022 | Vörös et al. |
| 2023/0089380 A1 | 3/2023 | Jiang et al. |
| 2023/0229772 A1 | 7/2023 | Saxe et al. |
| 2024/0119150 A1 | 4/2024 | Saxe et al. |

FOREIGN PATENT DOCUMENTS

| | | | | |
|---|---|---|---|---|
| CA | 3015240 A1 | * | 2/2019 | ............ G06F 40/30 |
| CA | 2951723 C | * | 4/2021 | ............... C12Q 1/04 |
| CN | 109145601 A | * | 1/2019 | ............ G06N 20/00 |
| CN | 110020861 A | * | 7/2019 | |
| CN | 110545305 A | * | 12/2019 | ............ G06N 3/006 |
| CN | 110728575 A | * | 1/2020 | |
| CN | 110858247 A | * | 3/2020 | |
| EP | 3018879 A1 | * | 5/2016 | ......... G06F 16/9535 |
| EP | 3076328 A1 | * | 10/2016 | ............. G06F 21/53 |
| EP | 3892198 A1 | * | 10/2021 | ........... A61B 5/0006 |
| JP | 2012027710 A | | 2/2012 | |
| JP | 2022518646 A | * | 3/2022 | |
| RU | 2680736 C1 | * | 2/2019 | ............. G06F 21/53 |
| WO | WO 2007/117636 A2 | | 10/2007 | |
| WO | WO-2019071095 A1 | | 4/2019 | |
| WO | WO 2019/150079 A1 | | 8/2019 | |
| WO | WO-2019145912 A1 | | 8/2019 | |
| WO | WO 2019/166989 A1 | | 9/2019 | |
| WO | WO-2020030913 A1 | | 2/2020 | |
| WO | WO-2020157479 A1 | | 8/2020 | |
| WO | WO-2022223940 A1 | | 10/2022 | |

OTHER PUBLICATIONS

Augasta and Kathirvalavakumar, "Pruning algorithms of neural networks—a comparative study", Cent. Eur. J. Comp. Sci. (2013); 3(3): 105-115.

Chiba, et al., "Analyzing Spatial Structure of IP Addresses for Detecting Malicious Websites", Journal of Information Processing (Jul. 2013); 21(3): 539-550.

Engelbrecht, Andries P., "A New Pruning Heuristic Based on Variance Analysis of Sensitivity Information", IEEE Transactions on Neural Networks (Nov. 2001); vol. 12, No. 6, pp. 1386-1399.

Kim, Hae-Jung, "Image-Based Malware Classification Using Convolutional Neural Network", In: Park J., Loia V., Yi G., Sung Y. (eds) Advances in Computer Science and Ubiquitous Computing. Lecture Notes in Electrical Engineering (2018); vol. 474, pp. 1352-1357.

Lison and Mavroeidis, "Neural Reputation Models learned from Passive DNS Data", "Neural reputation models learned from passive DNS data," 2017 IEEE International Conference on Big Data (Big Data), Boston, MA (Dec. 11-14, 2017); pp. 3662-3671, doi: 10.1109/BigData.2017.8258361.

Pennington and Worah, et al., "The Spectrum of the Fisher Information Matrix of a Single-Hidden-Layer Neural Network", 32nd Conference on Neural Information Processing Systems (NeurIPS 2018), Montréal, Canada, pp. 1-16.

Shah, S., et al., "Virus Detection using Artificial Neural Networks; International Journal of Computer Applications", International Journal of Computer Applications (0975-8887) (Dec. 2013); vol. 84, No. 5, pp. 17-23.

Tu, M., et al., "Reducing the Model Order of Deep Neural Networks Using Information Theory", IEEE Computer Society (2016); 2016 IEEE Computer Society Annual Symposium on VLSI, pp. 93-98.

Ba, et al., "Layer Normalization." [Online] Retrieved from the Internet https://arxiv.org/pdf/1607.06450.pdf>, Submitted on Jul. 21, 2016, 14 pages.

Cheplyaka, R., "Rank vs Order in R", Mar. 19, 2016 https://ro-che.info/articles/2016-03-19-rank-vs-order-r (Year: 2016), 4 pages.

Deo, A., et al., "Prescience: Probabilistic Guidance on the Retraining Conundrum for Malware Detection", AISec '16 Proceedings of the 2016 ACM Workshop on Artificial Intelligence and Security, Oct. 28, 2016, Vienna, Austria, Retrieved from the Internet http://delivery.acm.org/10.1145/3000000/2996769/p71-deo.pdf?ip=69.125.105.131&id=2996769&acc=OPENTOC&key=4D4702B0C3E38B35%2E4D4702B0C3E38B35%2E4D4702B0C3E38B35%2E9F04A3A78F7D3B8D&_acm_=1573741004_98b035a9ad71ffc3e5289851a65d39e7, 12 pages.

Harang and Ducau, "Measuring the speed of the Red Queen's Race", BlackHat USA 2018, Aug. 4-9, 2018, Las Vegas, NV, USA, 18 pages.

Harang and Ducau, "Measuring the speed of the Red Queen's Race", SOPHOS Presentation (2018), Retrieved from the Internet https://i.blackhat.com/us-18/Wed-August-8/us-18-Harang-Measuring-the-Speed-of-the-Red-Queens-Race.pdf, 48 pages.

Harang and Rudd, "Principled Uncertainty Estimation for Deep Neural Networks". [Online] arXiv:1810.12278 [cs.LG], [v1] Oct. 29, 2018, Retrieved from the Internet https://arxiv.org/abs/1810.12278v1.pdf, 8 pages.

Harang, R. "Estimating weight sharing in multi-task networks via approximate Fisher information," SOPHOS, [online] Retrieved from the Internet https://www.camlis.org/s/harang_CAMLIS17.pdf> Oct. 28, 2017, 31 pages.

Huang, L. et al., "Orthogonal Weight Normalization: Solution to Optimization over Multiple Dependent Stiefel Manifolds in Deep Neural Networks," [Online], Retrieved from the Internet: <URL: https://arxiv.org/pdf/1709.06079.pdf>, Nov. 21, 2017, 20 pages.

International Preliminary Report on Patentability for International Patent Application No. PCT/US2018/054558, dated Apr. 8, 2020, 5 pages.

International Search Report and Written Opinion for International Patent Application No. PCT/US2018/054558, mailed Dec. 10, 2018, 6 pages.

International Search Report and Written Opinion for International Patent Application No. PCT/GB2019/050199, mailed Mar. 29, 2019, 15 pages.

International Search Report and Written Opinion for International Patent Application No. PCT/IB2019/050642, mailed Apr. 12, 2019, 12 pages.

International Search Report and Written Opinion for International Patent Application No. PCT/IB2019/051629, mailed Jun. 17, 2019, 14 pages.

International Search Report and Written Opinion for International Patent Application No. PCT/GB2019/052222, mailed Nov. 12, 2019, 17 pages.

International Search Report and Written Opinion for International Patent Application No. PCT/GB2020/050188, mailed Mar. 31, 2020, 12 pages.

Ioffe and Szegedy, "Batch Normalization: Accelerating Deep Network Training by Reducing Internal Covariate Shift." [Online] Retrieved from the Internet https://arxiv.org/pdf/1502.03167v3.pdf>, Submitted on Feb. 11, 2015 (v1), last revised Mar. 2, 2015 (this version, v3), 11 pages.

Kang, et al., "Malware Classification Method via Binary Content Comparison", RACS'12, Oct. 23-26, 2012, San Antonio, TX, USA (2012); 6 pages, https://dl.acm.org/doi/pdf/10.1145/2401603.2401672.

Kardan and Stanley, "Fitted Learning: Models with Awareness of their Limits". [Online] arXiv:1609.02226v4 [cs.AI] Jul. 9, 2018, Retrieved from the Internet https://arxiv.org/pdf/1609.02226.pdf, 19 pages.

Kirkpatrick, J. et al., "Overcoming catastrophic forgetting in neural networks," PNAS (2017); 114 (13): 3521-3526.

Liao and Carneiro, "On the Importance of Normalisation Layers in Deep Learning with Piecewise Linear Activation Units." [Online] Retrieved from the Internet https://arxiv.org/pdf/1508.00330.pdf>, Submitted on Aug. 3, 2015 (v1), last revised Nov. 1, 2015 (this version, v2)), 7 pages.

Liao, et al., "Streaming Normalization: Towards Simpler and More Biologically-plausible Normalizations for Online and Recurrent

(56) References Cited

OTHER PUBLICATIONS

Learning." Center for Brains, Minds & Machines, Memo No. 057, [Online] Retrieved from the Internet https://arxiv.org/pdf/1610.06160.pdf>, Oct. 19, 2016, 21 pages.

Lundberg, S. M. et al., "A Unified Approach to Interpreting Model Predictions," 31st Conference on Neural Information Processing Systems (NIPS 2017), Long Beach, CA, USA, 10 pages.

Montavon, G. et al., "Methods for Interpreting and Understanding Deep Neural Networks," [Online], Retrieved from the Internet: <URL: https://arxiv.org/pdf/1706.07979.pdf>, Jun. 24, 2017, 14 pages.

Narayanan, et al., "A multi-view context-aware approach to Android malware detection and malicious code localization." Empir Software Eng (2018); 23: 1222-1274. Epub Aug. 30, 2017.

Pascanu, R. et al., "Revisiting natural gradient for deep networks," [Online], Retrieved from the Internet: <URL: https:/arxiv.org/pdf/1301.3584v7.pdf>, Feb. 17, 2014, 18 pages.

Ribeiro, M. T. et al., "Model-Agnostic Interpretability of Machine Learning," [Online], Retrieved from the Internet: <URL: https://arxiv.org/pdf/1606.05386.pdf>, Jun. 16, 2016, 5 pages.

Ribeiro, M. T. et al., "'Why Should I Trust You?' Explaining the Predictions of Any Classifier," [Online], Retrieved from the Internet: <URL: https://arxiv.org/pdf/1602.04938v3.pdf>, Aug. 9, 2016, 10 pages.

Ribeiro, M. T., "Lime—Local Interpretable Model-Agnostic Explanations," [Online Blog], Retrieved from the Internet: <URL: https://homes.cs.washington.edu/~marcotcr/blog/lime/>, Apr. 2, 2016, 7 pages.

Rudd, E.R., et al., "MOON: A Mixed Objective Optimization Network for the Recognition of Facial Attributes." [Online], Retrieved from the Internet: <URL:https://arxiv.org/abs/1603.07027>, arXiv:1603.07027 [cs.CV], Mar. 22, 2016, 17 pages.

Rudd, et al., "MEADE: Towards a Malicious Email Attachment Detection Engine", 2018 IEEE International Symposium on Technologies for Homeland Security (HST), IEEE, Oct. 23, 2018, pp. 1-7.

Rudd, et al., "The Extreme Value Machine". [Online] arXiv:1506.06112v4 [cs.LG] May 21, 2017, Retrieved from the Internet https://arxiv.org/abs/1506.06112.pdf, 12 pages.

Salimans, T. et al., "Weight Normalization: A Simple Reparameterization to Accelerate Training of Deep Neural Networks," [Online], Retrieved from the Internet: <URL: https://arxiv.org/pdf/1602.07868.pdf>, Jun. 4, 2016, 11 pages.

Sanghani, et al., "Personalized spam filtering using incremental training of support vector machine". 2016 International Conference on Computing, Analytics and Security Trends (CAST), IEEE Dec. 19, 2016, pp. 323-328, 6 pages.

Santos and Torres, "Macro Malware Detection using Machine Learning Techniques—A New Approach." In Proceedings of the 3rd International Conference on Information Systems Security and Privacy (ICISSP 2017, SCITEPRESS—Science and Technology Publications, Lda), pp. 295-302, ISBN: 978-989-758-209-7, ElevenPaths, Telefonica Digital Cyber Security Unit, Madrid, Spain. [Online], Retrieved from the Internet on Nov. 19, 2018: http://www.scitepress.org/Papers/2017/61322, 8 pages.

Saxe and Berlin, "Deep Neural Network Based Malware Detection Using Two Dimensional Binary Program Features," IEEE 2015,10th International Conference on Malicious and Unwanted Software: "Know Your Enemy" (Malware), 2015, pp. 11-20.

Saxe and Berlin, "eXpose: A Character-Level Convolutional Neural Network with Embeddings For Detecting Malicious URLs, File Paths and Registry Keys." [Online], Retrieved from the Internet: <https://arxiv.org/abs/1702.08568>, arXiv:1702.08568v1 [cs.CR], Feb. 27, 2017, 18 pages.

Schultz, et al., "Data Mining Methods for Detection of New Malicious Executables", Proceedings of the 2001 IEEE Symposium on Security and Privacy (2001); Oakland, CA, May 14-16, 2001; [Proceedings of the IEEE Symposium on Security and Privacy], Los Alamitos, CA: IEEE Comp. Soc., US, May 14, 2001, pp. 38-49, 12 pages.

Sethi and Kantardzic, "Handling adversarial concept drift in streaming data". Expert Systems With Applications (May 1, 2018); 97: 18-40. Available online Dec. 11, 2017.

Srivastava, et al., "Dropout: A Simple Way to Prevent Neural Networks from Overfitting." Journal of Machine Learning Research (2014); 15: 1929-1958. Submitted Nov. 2013; Published Jun. 2014, 30 pages.

Tahan, G., et al., "Mal:ID: Automatic Malware Detection Using Common Segment Analysis and Meta-Features." Journal of Machine Learning (2012); (Submitted Aug. 2011; Published Feb. 2012); 1: 1-48, 33 pages.

Theis, L. et al., "Faster gaze prediction with dense networks and Fisher pruning," [Online], Retrieved from the Internet: <URL: https://arxiv.org/pdf/1801.05787.pdf>, Jan. 17, 2018, 10 pages.

Tian, et al., "An automated classification system based on the strings of trojan and virus families." Malicious and Unwanted Software (Malware); 2009 4th International Conference, Piscataway, NJ, USA, Oct. 13, 2009, pp. 23-30, 8 pages.

Tolomei, G. et al., "Interpretable Predictions of Tree-based Ensembles via Actionable Feature Tweaking," [Online], Retrieved from the Internet: <URL: https://arxiv.org/pdf/1706.06691.pdf>, Jun. 20, 2017, 10 pages.

Tseng, Huihsin et al., U.S. Appl. No. 62/483,102, filed Apr. 7, 2017, 19 pages.

Tu, M. et al., "Ranking the parameters of deep neural networks using the Fisher information," 41st IEEE International Conference on Acoustics, Speech and Signal Processing, ICASSP 2016—Shanghai, China, Institute of Electrical and Electronics Engineers Inc., pp. 2647-2651 (2016).

U.S. Appl. No. 15/727,035, Notice of Allowance mailed Dec. 27, 2019, 7 pages.

U.S. Appl. No. 15/884,542, Office Action mailed Mar. 4, 2021, 53 pages.

U.S. Appl. No. 16/257,749, Notice of Allowance mailed Mar. 1, 2021, 10 pages.

U.S. Appl. No. 16/257,749, Office Action mailed Aug. 11, 2020, 14 pages.

Velez and Clune, Identifying Core Functional Networks and Functional Modules within Artificial Neural Networks via Subsets Regression, GECCO '16, Proceedings of the Genetic and Evolutionary Computation Conference 2016, Jul. 20-24, 2016, pp. 181-188.

Wu, et al., "L1-Norm Batch Normalization for Efficient Training of Deep Neural Networks." [Online] Retrieved from the Internet https://arxiv.org/pdf/1802.09769.pdf>, Submitted on Feb. 27, 2018, 8 pages.

U.S. Appl. No. 15/884,542, Office Action mailed Apr. 5, 2022, 32 pages.

U.S. Appl. No. 16/158,844, Office Action mailed May 24, 2022, 25 pages.

U.S. Appl. No. 16/853,803, Office Action mailed May 2, 2022, 9 pages.

Xu, K., et al., "DeepRefiner: Multi-layer Android Malware Detection System Applying Deep Neural Networks," IEEE European Symposium on Security and Privacy, 2018, 15 pages.

Chiba, Daiki et al., "Detecting Malicious Websites by Learning IP Address Features", 2012 IEEE/IPSJ 12th International Symposium on Applications and the Internet, Jul. 16, 2012 (Jul. 16, 2012), pp. 29-39.

International Search Report and Written Opinion for International Application No. PCT/GB2022/050681, mailed Jun. 20, 2022, 14 pages.

Huang, Y., et al., "Graph neural networks and cross-protocol analysis for detecting malicious IP addresses", Complex & Intelligent Systems (2023); 9(4): 3857-3869, Published Online Sep. 14, 2022.

International Preliminary Report on Patentability for International Application No. PCT/GB2022/050681, mailed Nov. 2, 2023, 7 pages.

Non-Final Office Action for U.S. Appl. No. 18/186,587 mailed Aug. 15, 2024, 11 pages.

Notice of Allowance for U.S. Appl. No. 17/239,128 mailed Jan. 26, 2024, 19 pages.

Notice of Allowance for U.S. Appl. No. 16/158,844 mailed Nov. 1, 2023, 11 pages.

(56) References Cited

OTHER PUBLICATIONS

Corrected Notice of Allowability for U.S. Appl. No. 17/314,625 mailed Oct. 24, 2023, 5 pages.
U.S. Appl. No. 16/263,264, Office Action mailed Feb. 22, 2022, 13 pages.
Buitinck, L., et al., "API design for machine learning software: experiences from the scikit-learn project", arXiv preprint (2013); 16 pages.
Dai, J., et al., "Efficient Virus Detection Using Dynamic Instruction Sequences", Journal of Computers (May 2009); 4(5): 405-414.
Devi, D., et al., "Detection of packed malware", SecurIT'12 (Aug. 17-19, 2012); p. 22.
Elovici, Y., et al., "Applying machine learning techniques for detection of malicious code in network traffic", KI 2007: Advances in Artificial Intelligence: 30th Annual German Conference on AI, KI 2007, Osnabrück, Germany (Sep. 10-13, 2007); Proceedings 30, Springer Berlin Heidelberg (2007); 44-50.
Henchiri, O., et al., "A feature selection and evaluation scheme for computer virus detection", Proceedings of the Sixth International Conference on Data Mining (ICDM'06), IEEE Computer Society (2006); 5 pages.
Joachims, T., "Making large-scale SVM learning practical LS-8 Report 24", Technical Report, University of Dortmund (1998); 18 pages.
Kecman, V., "Support vector machines-an introduction", StudFuzz, Springer-Verlag Berlin Heidelberg (2005); 177: 1-11.
Kolter, J. Z., et al., "Learning to detect and classify malicious executables in the wild", Journal of Machine Learning Research (2006); 7(12): 2721-2744.
Kolter, J. Z., et al., "Learning to detect malicious executables in the wild", Proceedings of the Tenth ACM SIGKDD International Conference on Knowledge Discovery and Data Mining (2004); 9 pages.
Menahem, E., et al., "Improving malware detection by applying multi-inducer ensemble", Computational Statistics & Data Analysis (2009); 53: 1483-1494.
Monnappa, K. A., "Introduction to Malware Analysis", Learning Malware Analysis: Explore the concepts, tools, and techniques to analyze and investigate Windows malware, Packt Publishing Ltd., Birmingham—Mumbai (2018); Chapter 1: pp. 7-10; Chapter 9: p. 362; 9 pages.
Mukkamala, S., et al., "Intrusion detection using an ensemble of intelligent paradigms", Journal of Network and Computer Applications (2005); 28(2): 167-182.
Notice of Allowance for U.S. Appl. No. 15/884,542 dated Jul. 13, 2023, 13 pages.
Russell, S. J., "Kernel Machines", Artificial Intelligence A Modern Approach, Pearson Education International (2010); Section 20(6): 749-751.
Sikorski, M., et al., "Practical malware analysis: the hands-on guide to dissecting malicious software", No. starch press (2012); pp. 2-3; pp. 11-13; p. 384; 12 pages.
Souppaya, M., et al., "Guide to malware incident prevention and handling for desktops and laptops", NIST Special Publication 800-83 Revision 1 (2013); 47 pages.
Tahan, G., et al., "Mal-id: Automatic malware detection using common segment analysis and meta-features", Journal of Machine Learning Research (2012); 13: 949-979.
U.S. Appl. No. 15/727,035, Office Action mailed Aug. 14, 2019, 11 pages.
U.S. Appl. No. 15/884,542, Advisory Action mailed Dec. 6, 2022, 3 pages.
U.S. Appl. No. 15/884,542, Office Action mailed Jan. 26, 2023, 32 pages.
U.S. Appl. No. 15/884,542, Office Action mailed Sep. 21, 2022, 32 pages.
U.S. Appl. No. 15/907,807, Notice of Allowance mailed Oct. 20, 2021, 5 pages.
U.S. Appl. No. 16/158,844, Advisory Action mailed Jun. 6, 2023, 3 pages.
U.S. Appl. No. 16/158,844, Office Action mailed Jan. 4, 2023, 32 pages.
U.S. Appl. No. 16/158,844, Office Action mailed Jun. 29, 2023, 35 pages.
U.S. Appl. No. 16/263,264, Corrected Notice of Allowability mailed Jan. 5, 2023, 2 pages.
U.S. Appl. No. 16/263,264, Notice of Allowance mailed Oct. 4, 2022, 9 pages.
U.S. Appl. No. 16/853,803, Notice of Allowance mailed Nov. 30, 2022, 7 pages.
U.S. Appl. No. 17/239,128, Office Action mailed Jul. 12, 2023, 33 pages.
U.S. Appl. No. 17/314,625, Corrected Notice of Allowability mailed Mar. 29, 2023, 2 pages.
U.S. Appl. No. 17/314,625, Notice of Allowance mailed Mar. 7, 2023, 10 pages.
Wang, T., et al., "Detecting unknown malicious executables using portable executable headers", 2009 Fifth International Joint Conference on Inc, IMS and IDC. IEEE (2009); p. 278.
Wilding, ED., "The authoritative international publication on computer virus prevention, recognition and removal", Virus Bulletin (Nov. 1990); 24 pages.
Ye, Y., et al., "SBMDS: an interpretable string based malware detection system using SVM ensemble with bagging", Journal in Computer Virology (2009); 5: 283-293.
Ye, Y., et al., "Hierarchical associative classifier (HAC) for malware detection from the large and imbalanced gray list", Journal of Intelligent Information Systems (2010); 35: 1-20.
U.S. Appl. No. 15/884,542, Office Action mailed Sep. 9, 2021, 44 pages.
Notice of Allowance for U.S. Appl. No. 18/186,587, by Saxe, Joshua Daniel et al., mailed Oct. 31, 2024, 11 pages.
Notice of Allowance for U.S. Appl. No. 18/483,795, by Saxe, Joshua Daniel et al., mailed Feb. 19, 2025, 13 pages.
U.S. Appl. No. 19/211,885, inventor Saxe, Joshua Daniel et al., filed May 19, 2025.

* cited by examiner

METHODS AND APPARATUS FOR MANAGEMENT OF A MACHINE-LEARNING MODEL TO ADAPT TO CHANGES IN LANDSCAPE OF POTENTIALLY MALICIOUS ARTIFACTS

CROSS-REFERENCE TO RELATED APPLICATIONS

This application is a continuation of International Patent Application No. PCT/GB2019/052222, filed Aug. 7, 2019, entitled "Methods and Apparatus for Management of a Machine-Learning Model to Adapt to Changes in Landscape of Potentially Malicious Artifacts," which claims priority to and the benefit of U.S. Provisional Patent Application No. 62/715,762, filed Aug. 7, 2018 and titled "Malware Change Measurement," the content of each of which is incorporated herein by reference in its entirety for all purposes.

BACKGROUND

The embodiments described herein relate to methods and apparatus for detecting changes in types of potentially malicious artifacts to be classified and managing a machine-learning model to adapt to the detected changes. More particularly, the embodiments described herein relate to methods and apparatus for management of a machine-learning model to adapt to changes in the landscape of artifacts that can potentially carry out malicious activity.

Malicious artifacts can be embedded and distributed in several forms (e.g., text files, executable files, etc.) that are seemingly harmless in appearance but hard to detect and can be prone to cause severe damage or compromise of sensitive hardware, data, information, and the like.

Machine learning models, including neural networks, can be trained to classify artifacts that can potentially carry out malicious activity. However, the landscape of potentially malicious artifacts can change over time. The machine learning models can be retrained to adapt to the changes in the landscape of potentially malicious artifacts. Some known implementations of systems managing retraining of machine learning models, however, can be ineffective at adapting to the changes, resource intensive in practice, and/or require manual intervention of human analysts.

Thus, a need exists for improved apparatuses and methods for adapting machine-learning models to changes in the landscape of potentially malicious artifacts.

SUMMARY

According to an aspect of the present disclosure, an apparatus includes a memory and a processor. The processor can be configured to train, at a time, a machine-learning model to output (1) an identification of whether an artifact is malicious and (2) a confidence value associated with the identification of whether the artifact is malicious. The processor can be configured to receive a set of artifacts during a set of time periods, each time period from the set of time periods being after the time. The processor can be configured to provide, for each time period from the set of time periods, a representation of each artifact from the set of artifacts received during that time period to the machine learning model to obtain as an output of the machine learning model an indication of whether that artifact is malicious and a confidence value associated with the indication of whether that artifact is malicious. The processor can be further configured to calculate a confidence metric for each time period from the set of time periods based on the confidence value associated with each artifact from the set of artifacts received during that time period. The processor can further be configured to send an indication to retrain the machine learning (ML) model in response to the confidence metric for at least one time period from the set of time periods meeting a retraining criterion.

In some embodiments, a non-transitory processor-readable medium stores program instructions for execution by a processor. The program instructions, when executed by the processor, are configured to cause the processor to train, at a time, a machine-learning model to output (1) an identification of whether an artifact is malicious and (2) a confidence value associated with the identification of whether the artifact is malicious. The program instructions are further configured to receive, during a time period after the time, a set of artifacts, and provide, for each artifact from the set of artifacts, a representation of that artifact as an input to the machine-learning model to obtain an output of the machine-learning model. The output can include an indication of whether that artifact is malicious and a confidence value associated with the indication of whether that artifact is malicious. The program instructions, when executed by the processor, can be further configured to cause the processor to compare the confidence value for each artifact from the set of artifacts to a high confidence criterion to identify a number of artifacts having confidence values that meet the high confidence criterion. In some implementations, the program instructions can further cause the processor to compare the confidence value for each artifact from the set of artifacts to a low confidence criterion to identify a number of artifacts having confidence values that meet the low confidence criterion. The program instructions can further cause the processor to send an indication to retrain the machine learning model in response to a metric associated with at least one of the number of artifacts having confidence values that meet the high confidence criterion or the number of artifacts having confidence values that meet the low confidence criterion meeting a retraining criterion.

In some embodiments, a method can include training, at a time, a machine-learning model to output (1) an identification of whether an artifact is malicious and (2) a confidence value associated with the identification of whether the artifact is malicious. The method can include receiving a set of artifacts during a time period after the time, and providing for each artifact from the set of artifacts, a representation of that artifact as an input to the machine-learning model. The method can further include obtaining as an output of the machine-learning model an indication of whether that artifact is malicious and a confidence value associated with the indication of whether that artifact is malicious. The method can further include upon obtaining the output, comparing the confidence value for each artifact from the set of artifacts to a confidence criterion to identify a number of artifacts having confidence values that do not meet the confidence criterion. The method can further include evaluating whether a metric associated with the number of artifacts meets a retraining criterion and sending an indication to retrain the machine-learning model in response to the metric meeting the retraining criterion.

DETAILED DESCRIPTION

Figure 1:
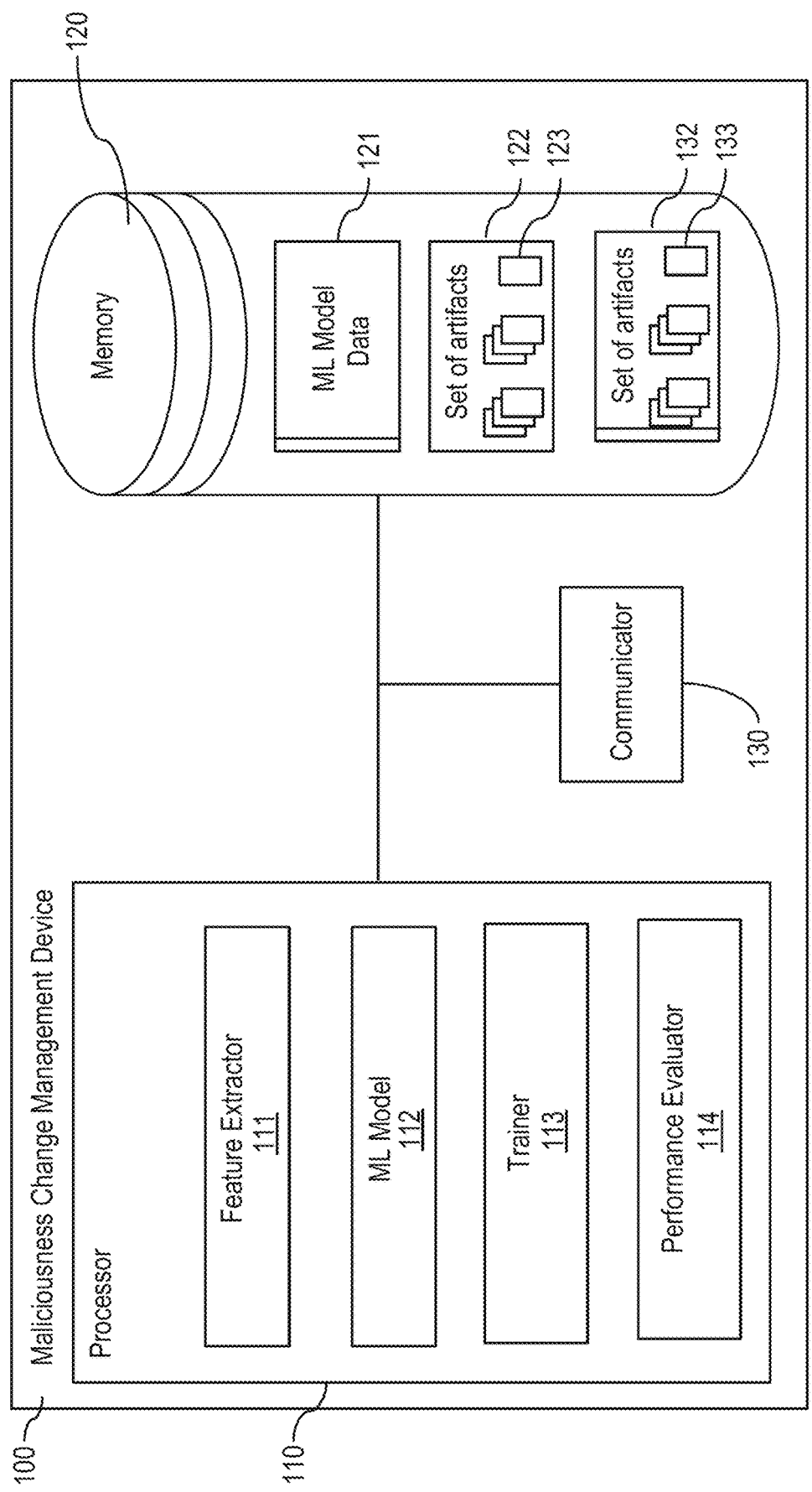
FIG. 1 is a schematic block diagram of a Maliciousness Change Management (MCM) Device for evaluating the performance and adapting a machine-learning model, according to an embodiment.

In some embodiments, an apparatus includes a memory and a processor operatively coupled to the memory. The processor can be configured to train, at a time, a machine-learning (ML) model to output (1) an identification of whether an artifact is malicious and (2) a confidence value associated with the identification of whether the artifact is malicious. The processor can be configured to receive a set of artifacts during each time period from a set of time periods, each time period from the set of time periods being after the time. The processor can be configured to provide, for each time period from the set of time periods, a representation of each artifact from the set of artifacts received during that time period to the machine learning model to obtain as an output of the machine learning model an indication of whether that artifact is malicious and a confidence value associated with the indication of whether that artifact is malicious. The processor can be further configured to calculate a confidence metric for each time period from the set of time periods based on the confidence value associated with each artifact from the set of artifacts received during that time period. The processor can further be configured to send an indication to retrain the machine learning (ML) model in response to the confidence metric for at least one time period from the set of time periods meeting a retraining criterion.

In some embodiments, the processor can be configured to, train the neural network using files having a maliciousness classification known to the neural network, and then test the performance of the neural network in classifying files having a maliciousness classification unknown to the neural network.

In some embodiments, a non-transitory processor-readable medium stores program instructions for execution by a processor. The program instructions, when executed by the processor, are configured to cause the processor to train, at a time, a machine learning model to output (1) an identification of whether an artifact is malicious and (2) a confidence value associated with the identification of whether the artifact is malicious. The program instructions are further configured to receive, during a time period after the time, a set of artifacts, and provide, for each artifact from the set of artifacts, a representation of that artifact as an input to the machine learning model to obtain an output of the machine learning model. The output can include an indication of whether that artifact is malicious and a confidence value associated with the indication of whether that artifact is malicious. The program instructions, when executed by the processor, can be further configured to cause the processor to compare the confidence value for each artifact from the set of artifacts to a high confidence criterion to identify a number of artifacts having confidence values that meet the high confidence criterion. In some implementations, the program instructions can further cause the processor to compare the confidence value for each artifact from the set of artifacts to a low confidence criterion to identify a number of artifacts having confidence values that meet the low confidence criterion. The program instructions can further cause the processor to send an indication to retrain the machine learning model in response to a metric associated with at least one of the number of artifacts having confidence values that meet the high confidence criterion or the number of artifacts having confidence values that meet the low confidence criterion meeting a retraining criterion.

In some embodiments, a method can include training, at a time, a machine-learning model to output (1) an identification of whether an artifact is malicious and (2) a confidence value associated with the identification of whether the artifact is malicious. The method can include receiving a set of artifacts during a time period after the time, and providing for each artifact from the set of artifacts, a representation of that artifact as an input to the machine-learning model. The method can further include obtaining as an output of the machine-learning model an indication of whether that artifact is malicious and a confidence value associated with the indication of whether that artifact is malicious. The method can further include upon obtaining the output, comparing the confidence value for each artifact from the set of artifacts to a confidence criterion to identify a number of artifacts having confidence values that do not meet the confidence criterion. The method can further include evaluating whether a metric associated with the number of artifacts meets a retraining criterion and sending an indication to retrain the machine-learning model in response to the metric meeting the retraining criterion.

Computer files ("computer file(s)" or "file(s)") such as text or document files (collectively, "document file(s)"), executable files, and/or the like can be a common delivery mechanism for malware (i.e., malicious software). For example, document files can include embedded, executable scripts or macros that, in some cases, can be configured to cause malicious activity on a host device (e.g., a computer) or in a host environment (e.g., of a computer, virtual machine, etc.).

Malicious content developers are often creating new pieces of malware and introducing changes in their software.

Some of these changes are related to variations in the functionality or the introduction of new capabilities. Others are part of a continuous effort to avoid detection by the cybersecurity industry. To achieve this goal, there are several techniques that malware developers use, from simple ones such as addition of superfluous content to the files or packing, to advanced polymorphism techniques. On the other side, anti-malware solutions attempt to identify these new or modified malware programs with high precision in the least amount of time possible following their introduction. Traditionally, malware detection has been done by looking for specific attributes of the programs, such as code, binary sequences, file properties, system calls, and others, which are unique to a malware sample or campaign. This approach is commonly referred as "signature-based detection". Typically, these patterns (signatures) to be matched against files are hand-written by security analysts as soon as they can analyze some novel piece of malware that is not being detected. These signatures are carefully designed to have high specificity and a very low false positive rate.

Because of the reactive nature of the signature-based approach, in recent years, statistical techniques driven by machine learning research have been introduced for the task of malware detection in an attempt to improve detection coverage for the window between the introduction of new malware samples and the writing of specialized signatures to detect the newly introduced malware. These machine learning approaches look for "features" which may be numerical statistics derived from the artifacts (e.g., files), or various combinations of those features, which are indicative of malicious activity in a data-driven manner. Machine learning (ML) based malware classifiers are trained with several millions of classes of malware and benign samples, and can be trained to learn one or more decision boundaries that can used to distinguish between samples that fall on either side of the decision boundaries to classify the types of malware and benign samples. A decision boundary can be a region of a problem space, the problem space being defined by features of the data, in which the output label of a classifier is ambiguous. FIGS. 4A-4D illustrate decision boundaries (e.g., decision boundaries 431A, 431C, and 431D) learned by ML models to distinguish between data sets represented by the dots 434a, the dots 434b, and the dots 434c shown on the feature space (feature 1 vs feature 2). The features can be any suitable numerical statistic or combination of numerical statistics derived from each set of artifacts represented by each set of dots. Example numerical statistics can be counts of specific strings, counts of specific characters, components derived from analyses of the set of artifacts (e.g., principal components), etc.,) If the decision surface is a hyperplane, then the classification problem is linear, and the classes are linearly separable. ML models and/or classifiers can be configured to extract patterns in the data in a way that generalizes to unseen samples outside their training set. While ML models (otherwise referred to as ML classifiers) have proven to be powerful at detecting and/or classifying malware that they have never encountered while training, the changing nature of the landscape of potentially malicious artifacts i.e., the collection of potentially malicious artifacts, causes their performance to degrade with time, as old campaigns are retired or updated and new ones are developed.

In the field of statistical learning, concept drift refers to the change in the relationship between input features and the target variable for the underlying problem over time. This phenomenon is also known as covariate shift, dataset shift or non-stationarity. This change in the underlying statistical properties of the data on which the task depends is challenging for machine learning classifiers, as one of the main assumptions under which the machine learning classifiers are trained, is that the data that is going to see in testing upon deployment comes from the same data generation process as the data the machine learning classifiers were trained on. In other words, ML tools and algorithms typically are configured to assume that the data is sampled from a stationary distribution. Intuitively, the malware data generation process does not fit this assumption well. On the contrary, malware development is dynamic, and changes over time by nature to avoid detection. One approach to deal with a changing data distribution is to retrain the ML model as frequently as possible. However, this retraining strategy can be cost intensive in terms of human effort, resources allocated, and time without an informed strategy of retraining the ML model.

Accordingly, there is a need for an apparatus and method for better management of machine learning models to adapt to changes in the landscape of potentially malicious artifacts. Disclosed herein are apparatuses and methods to analyze changes in the landscape of potentially malicious artifacts over time, estimate the rate at which malware campaigns are generated and retired, and identify clusters of potentially novel malware families. Also disclosed herein are apparatuses and methods to make predictions about the maliciousness of a given artifact, estimate a confidence value associated with the predictions, and use the estimated confidence value to evaluate performance of the ML model used, and informed by the evaluation, update and/or retrain the ML model to better classify a newly introduced potentially malicious artifact.

While the methods and apparatus are described herein as analyzing change in landscape of potentially malicious artifacts, in other instances a Maliciousness Change Management (MCM) device (such as MCM device 100 of FIG. 1) can be used to classify, analyze and adapt to changes in a landscape of any collection or stream of artifacts, events, objects, and/or data. As an example, an MCM device can be used to process and/or classify, and adapt an ML model to changes in a landscape of an artifact such as, for example, any portable executable file(s), registry key(s), dataset(s), filepath(s), Uniform Resource Locator (URL), device(s), device behavior, user behavior, network behavior, network identifier, and/or entity represented and/or associated with computer-related resources. For further examples, an artifact can include a function of code (e.g., of software code, source code, machine code, a webpage(s), a data file(s), a model file(s), a source file(s), a script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet, a laptop, a multimedia device, etc.), a network address (e.g., a Media Control (MAC) address, Internet Protocol (IP) address, etc.) of a compute device, and/or the like.

As another example, an MCM device can process and/or classify, and adapt an ML model to changes in a landscape of an artifact such as an event stream such as a series of function calls and/or instructions, an occurrence of specific data types and/or instructions within a given time period, a series of network traffic events, and/or the like. As yet another example, an MCM device can process and/or classify, and adapt an ML model to changes in the landscape of data streams including, for example, video data, image data, audio data, textual data, and/or the like. As a further example, an MCM device can process and/or classify, and adapt an ML model to changes in the landscape of configuration data such as, for example, device settings, network settings, application settings, registry keys, and/or the like.

FIG. 1 is a schematic block diagram of a Maliciousness Change Management (MCM) device 100 for evaluating a performance of a machine-learning model for detecting and/or classifying potentially malicious artifacts and suitably updating the ML model, according to an embodiment. The Maliciousness Change Management device 100, also referred to herein as "the MCM device" or "the device", can be a hardware-based computing device and/or a multimedia device, such as, for example, a compute device, a server, a desktop compute device, a laptop, a smartphone, a tablet, a wearable device, an implantable device, and/or the like. The MCM device 100 includes a processor 110, a memory 120 and a communicator 130.

The memory 120 of the MCM device 100 can be, for example, a random access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 110 to perform one or more processes, functions, and/or the like (e.g., the feature extractor 111, the ML model 112, the trainer 113, and/or the performance evaluator 114). In some implementations, the memory 120 can be a portable memory (e.g., a flash drive, a portable hard disk, and/or the like) that can be operatively coupled to the processor 110. In other instances, the memory can be remotely operatively coupled with the maliciousness classification device. For example, a remote database server can be operatively coupled to the maliciousness classification device.

The memory 120 can store ML model data (e.g., neural network data) 121 and a set of artifacts 122. The ML model data 121 can include data representing parameters of the ML model 112 (e.g., parameters specifying the architecture of a neural network included in the ML model 112, weights and adjustments to weights associated with a neural network included in the ML model 112, etc.), data generated by the ML model 112 (or model included in the ML model, e.g., neural networks included) during classification of a file (e.g., temporary variables, return addresses, and/or the like). In some implementations, the ML model 112 can be a neural network, and parameters specifying the architecture of the neural network, adjustments to the architecture, and/or the data generated by the neural network can be included in the ML model data 121. In some implementations, the ML model 112 can be a set of neural networks, each neural network being trained on a different set of training artifacts (e.g., each set of training artifacts being received during a particular time period from a set of time periods. ML model data 121 can include the different sets of training artifacts, parameters specifying the architecture of each neural network of the set of neural networks, the adjustments to the architecture each neural network upon training, and/or the data generated by each neural network upon training and/or testing with sets of artifacts received during a set of time periods.

The ML model data 121 can include data used by the ML model 112 to process and/or analyze an artifact (e.g., decision points associated with the ML model 112, and/or other information related to the ML model 112). The ML model data 121 can include data associated with model performance (e.g., classifications of artifacts, confidence values associated with artifacts, low and/or high confidence threshold criteria, retraining criteria, etc.), metrics generated by the evaluator 114 (e.g., confidence metrics, distance measures, metrics of trends in confidence metrics, etc.), and data used by the trainer 113 (e.g., training schedule, training data sets, test data sets) and data associated with evaluator 114 (e.g., flags associated with artifacts, indications used by the evaluator and/or the trainer to retrain the ML model, summaries generated for human analysts, etc.), as described in further detail herein.

The communicator 130 can be a hardware device operatively coupled to the processor 110 and memory 120 and/or software stored in the memory 120 and executed by the processor 110. The communicator 130 can be, for example, a network interface card (NIC), a Wi-Fi™ module, a Bluetooth® module and/or any other suitable wired and/or wireless communication device. Furthermore, the communicator 130 can include a switch, a router, a hub and/or any other network device. The communicator 130 can be configured to operatively connect the maliciousness classification device 100 to a communication network (not shown in FIG. 1). In some instances, the communicator 130 can be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communicator 130 can facilitate receiving and/or transmitting a file and/or a set of files through a communication network. In some instances, a received file can be processed by the processor 110 and/or stored in the memory 120 as described in further detail herein.

The processor 110 can be, for example, a hardware based integrated circuit (IC) or any other suitable processing device configured to run and/or execute a set of instructions or code. For example, the processor 110 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 110 is operatively coupled to the memory 120 through a system bus (for example, address bus, data bus and/or control bus).

The processor 110 can include a feature extractor 111, a machine-learning (ML) model 112, a trainer 113, and a performance evaluator (also referred to as "the evaluator") 114. The feature extractor 111, the ML model 112, the trainer 113, and/or the performance evaluator 114 can be software stored in memory 120 and executed by processor 110 (e.g., code to cause the processor 110 to execute the feature extractor 111, the ML model 112, the trainer 113, and/or the evaluator 114 can be stored in the memory 120) and/or a hardware-based device such as, for example, an ASIC, an FPGA, a CPLD, a PLA, a PLC and/or the like.

The feature extractor 111 can be configured to receive or retrieve an artifact (e.g., a file) as input and output a feature vector associated with the artifact. In some implementations, the feature extractor 111 extracts features from the file to form, generate, and/or otherwise define a feature vector, such as to express, represent, and/or provide indication of the extracted features. In some implementations, the feature extractor 111 be configured to implement various pattern recognition techniques such as those including parsing, detection, identification, rules, evaluating, generating, and/or defining a set of values associated with the file. The extracted features of the file may include, resemble, or correspond to various data types, such as of streams, files, headers, variable definitions, routines, sub-routines, strings, elements, subtrees, tags, or text containing embedded scripts, and/or the like. The feature extractor 111 can be configured to define a feature vector by implementing a hashing function. For example, in some implementations, the feature extractor 111 can be configured to define the feature vector by extracting portions of an artifact (e.g., strings, sequence of strings, etc.,) and providing each portion as an input to a hash function. The feature extractor 111 can be configured to implement any suitable hashing function to define the feature vector, for subsequent input to the ML model 112 (e.g., a neural network).

In some implementations the feature extractor 111 can generate a set of n-gram representations associated with the extracted features, and input each n-gram representation (e.g., representative of a feature) to a hash function to produce a hash value (e.g., via the hashing trick, etc.). The feature extractor 111, using the hash values, can form a feature vector (e.g., of pre-determined length and/or of variable length). For example, the feature extractor 111 can be configured to extract features of a document file such as a word processing file (e.g., a '.doc' file). In some implementations, the features can include or correspond to internal representations or structures of the document file. As another example, in some implementations, the feature extractor 111 can be configured to extract features of other data types or structures, such as of text or character streams, program instructions, macros, embedded Visual Basic Application (VBA) code, metadata associated with a word processing file, and the like.

In some implementations, the feature extractor 111 can then, for example, tokenize the extracted features into printable strings, such as by not including XML delimiting characters ('<' or '>'), or removing any length less than a specified length (e.g., 5 characters). In some implementations, the feature extractor 111 can be configured to concatenate the representations of two or more features to form a single feature representation ("script string", "single feature representation", "file feature representation", "text feature representation", "feature representation").

For example, the feature extractor 111 can extract a set of scripts from a file to concatenate a representation (e.g., as in a bag of words or n-gram model or representation) of each of the scripts in the set of scripts, to form a single representation (e.g., a script string, sequence of characters, etc.). In some implementations, the feature extractor 111 can be configured to implement a hashing function to define a feature vector based on the concatenated, single feature representation.

In some implementations, any other suitable processes, characteristics and/or values can be used to define the feature vector and/or set of values associated with the file. For example, in some instances, the feature vector can be formed from extracted features based on a lookup table, a data map, an associative array, and/or any other data structure and/or function. Such a function can be used instead of or in addition to a hash function. For another example, any other data extracted and/or calculated from the file such as string length values associated with strings within the file, a variance of string length values associated with strings within the file, informational entropy values associated with the file (e.g., calculated based on a frequency of byte values, sequences and/or patterns within one or more byte windows of the file), byte values within the file, values computed based on byte values within the file (e.g., byte value ranges within the file, a standard deviation associated with byte values in the file, etc.) a length of the file, an author of the file, a publisher of the file, a compilation date of the file, data pertaining to whether a valid signature is included with the file, other information that can be parsed from a Portable Executable (PE) file (including but not limited to the size of the header and/or the size of components of the file, such as image sizes and/or the size of the code, versions of operating systems configured to run and/or open the file, section names, entry points, symbol table information, and/or similar information), images and/or representation of images associated with the file, and/or the like, can be used to define the feature vector and/or set of values associated with the file. Additional detail regarding such data extracted and/or calculated from the file can be found in U.S. patent application Ser. No. 15/228,728, filed Aug. 4, 2016 and titled "Methods and Apparatus for Machine Learning Based Malware Detection, now U.S. Pat. No. 9,690,938, and U.S. patent application Ser. No. 15/343,844, filed Nov. 4, 2016 and titled "Methods and Apparatus for Detecting Malware Samples with Similar Image Sets," now U.S. Pat. No. 9,672,358, each of which is incorporated herein by reference in its entirety, for all purposes.

Figure 4A:
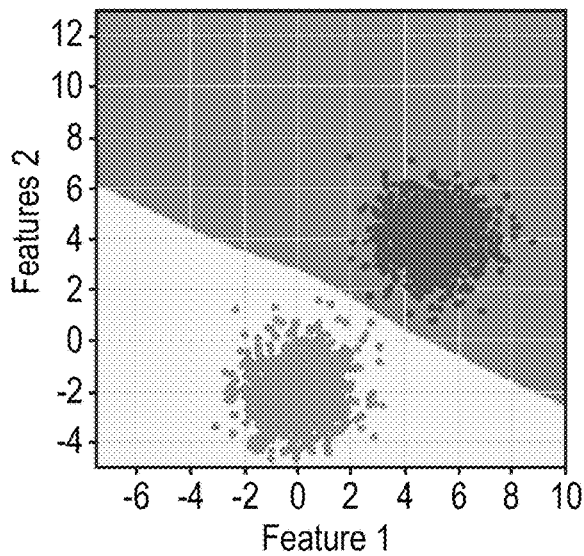
FIG. 4A is a representation of a decision boundary used by an ML model trained with data including two sets of artifacts.
Figure 4B:
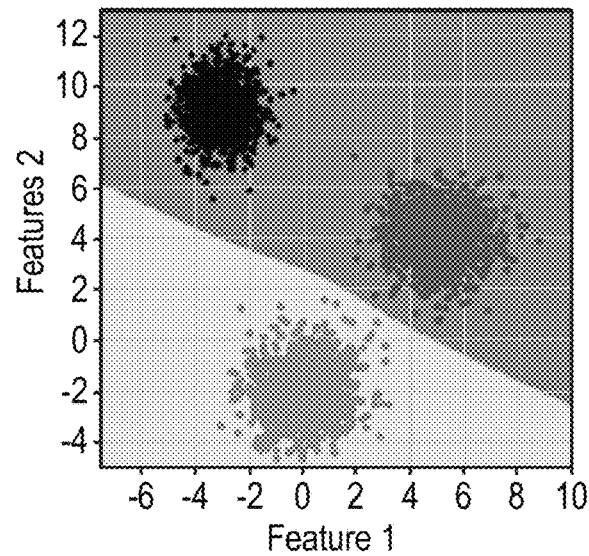
FIG. 4B is a representation of an updated decision boundary of the decision boundary of FIG. 4A with reference to an introduction of a new third set of artifacts.
Figure 4C:
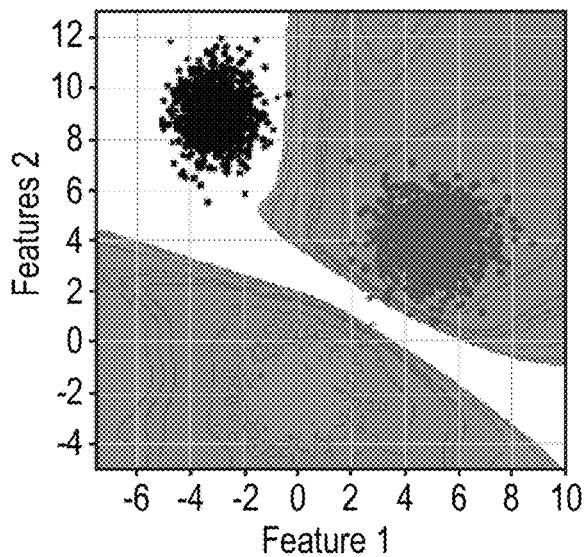
FIG. 4C is a representation of updated decision boundaries of the decision boundary of FIG. 4A after the ML model is retrained using an MCM Device, according to an embodiment.
Figure 4D:
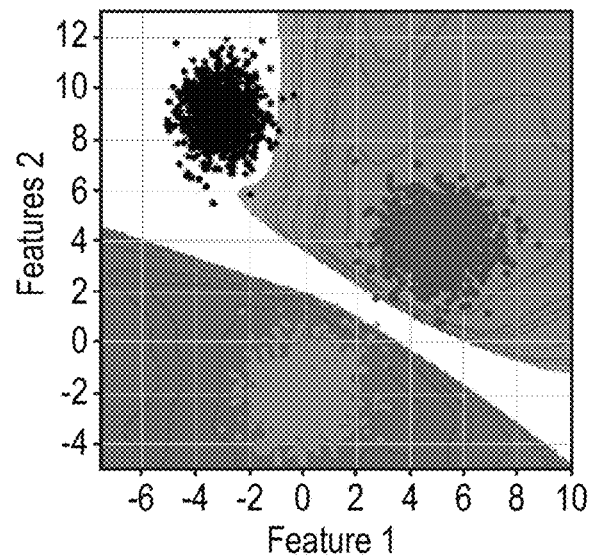
FIG. 4D is a representation of updated decision boundaries of the decision boundary of FIG. 4A after the ML model is retrained using an MCM Device, according to another embodiment.

The machine-learning (ML) model 112 can be one or more suitable mathematical and/or statistical model(s) used in the MCM device 100 to detect and/or classify potentially malicious artifacts. ML model 112 can be trained to analyze statistical properties of a data set including data samples belonging to two or more classes and learn one or more decision boundaries that can be used to distinguish between samples that fall on either side of the decision boundaries to classify the types of samples (e.g., malware and benign samples). A decision boundary can be a region of a feature space defining the distribution of data or artifacts, the feature space being defined by two or more features of the data, in which the output label of a classifier is ambiguous. FIGS. 4A-4D illustrate charts representing artifacts belong to three classes represented by the dots 434a, the dots 434b, and the dots 434c, on the feature space defined by plotting feature 1 vs feature 2. As described above, features 1 and 2 can be any suitable common numerical representation of the set of artifacts. FIG. 4A shows a representation of a performance of an ML model that has been trained to learn a decision boundary 431A between the two classes of artifacts represented by dots 434a and 434b. FIG. 4B shows the introduction of the artifacts of a third class represented by the dots 434c, clustered distinctly away from the dots 434a and 434b as represented in the feature space defined by features 1 and 2. The ML model may use the decision boundary 431A and show decreased performance encountering the new data by misclassifying the third set of artifacts represented by dots 434c as part of the class represented by the dots 434b, as shown in FIG. 4B. The ML model can be retrained to relearn an updated set of decision boundaries to distinguish between the data sets. FIG. 4C shows a decision boundary 431C to distinguish between data represented by the dots 434a, 434b and 434c. FIG. 4D shows another version of a decision boundary 431D learned by an ML model according to another embodiment, to distinguish between the dots 434a, 434b, and 434c shown on the feature space (feature 1 vs feature 2).

Returning to FIG. 1, in some embodiments, the ML model 112 can be a neural network. The neural network can be trained to receive a representation of an artifact and output an identification of whether the artifact is malicious and (2)

a confidence value associated with the identification of whether the artifact is malicious. In some embodiments, the neural network can be trained to output an indication of a classification of maliciousness of the artifact and (2) a confidence value associated with the indication of classification. While described to be a neural network or to include a neural network, in some embodiments, the ML model 112 can be or include a decision tree model or a random forest model. In some embodiments, the ML model 112 can include a combination of two or more ML tools (e.g., a neural network and a decision tree).

In some embodiments, the ML model 112 can be an ML model (e.g., a neural network, decision tree, or a random forest) that outputs the identification and/or classification of the artifact and the confidence value. In some embodiments, the ML model 112 can include a ML model and a classifier. The neural network can output an output vector and the classifier associated with the neural network can receive the output vector and provide the identification/classification of maliciousness of the artifact and the confidence value. For example, in some implementations, the classifier of ML model 112 can receive an output vector from the neural network of ML model 112 and produce a binary classification of whether the file is determined to be benign or malicious and a confidence value associated with the binary classification. In some other implementations, the classifier can receive the output vector from the neural network of ML model 112 and based on the output vector, associate the file with a known class of malicious files among several known classes of malicious files and a confidence value associated with the classification.

In some embodiments, the ML model 112 can include a set of ML models (not shown) each ML model being a neural network, each neural network trained on a different set of training artifacts each set of artifacts being received during a time period from a set of time periods.

In some embodiments, the ML model 112 can be or include a neural network configured to implement deep learning The processor 110 of the MCM device 100 can use the trainer 113 to train the ML model 112. The trainer 113 can be configured to organize and maintain sets of artifacts including a training data set that includes training artifacts and/or a test data set that includes test artifacts. The trainer 113 can be configured to organize and maintain a training and/or retraining schedule of the ML model 112, and data associated with a history of training the ML model 112. The trainer 113 can be configured to receive and maintain over time new artifacts that can include potentially malicious artifacts that have been newly introduced. In some implementations, the trainer 113 can receive and record newly added labelled artifacts with known maliciousness classification and use the labeled artifacts to improve and/or retrain ML model 112. In some implementations, the trainer 113 can maintain a set of artifacts labelled by the time periods associated with their collection from a data source or introduction into a data source (e.g., into network traffic associated with specific communication pathways, general internet, etc.) or the time periods when they were received as samples from a set of time periods (e.g., artifact samples received each month from a set of months). The trainer 113 can then use the set of artifacts based on the time periods to generate suitable configurations of training data sets including training artifacts to train and/or retrain the ML model 112. For example, the trainer 114 can be configured to use ML model data 121 included in the memory 120 to build the ML model 112 at a first time and use a training data set having labeled training artifacts of known classification (i.e., known to be malicious or labelled according to known type of maliciousness) from the of the set of artifacts 122 in the memory 120 to train the ML model 112 to classify the known or labelled artifacts.

In some implementations, the trainer 113 can use sets of artifacts associated with a set of time periods to train and/or test a set of ML models included in the ML model 112. In some instances, the set of ML models included in the ML model 112 can be configured such that each ML model is trained with a set of artifacts from the sets of artifacts wherein each set of artifacts overlaps with the next set of artifacts by one time period. In some instances, the trainer 113 can operate to train and/or test a set of ML models included in the ML model 112, using sets of artifacts received during a set of time periods occurring after the training of each model in the models of ML model 112. The training and testing can be such that each time period from the set of time periods is associated with a set of artifacts. For example, the training and/or testing can be such that ML model 112 includes a set of twelve ML models ($M_1$, $M_2$ ... $M_{12}$,) each ML model being trained with a set of artifacts ($S_1$, $S_2$ ... $S_{12}$). The set of artifacts can be received during twelve time periods ($T_1$, $T_2$, ... $T_{12}$) such that each ML model is trained on a set of artifacts and tested or scored on a different set of artifacts received during time periods following the training.

In some instances, each time period from the set of time periods overlaps at least one remaining time period from the set of time periods. For example, time period $T_2$ can overlap with $T_1$ by a portion $T_{21}$. As an example, the time period $T_1$ can include a first month and $T_2$ can include the first month and a second month, the first month being the overlapping portion. In some instances, each time period from the set of time periods is mutually exclusive of the remaining time periods from the set of time periods. As an example, the time period $T_1$ can include a first month and $T_2$ can include the second month.

For example, the trainer 113 can set one or more parameters of the neural network in ML model 112 and during training suitably adjust weights of the neural network based on feedback on the performance of the neural network on known classifications of artifacts. Once trained to meet a set behavior (e.g., trained over a specific set of data or trained to achieve a specific accuracy of classification of training artifacts in a training data set) the trainer 113 can indicate the ML model 112 as ready for deployment until being triggered for a retraining.

In some implementations, the ML model 112 can include multiple models and the trainer 113 can be configured to train each model using a different set of artifacts as training data set. For example, given a data set that includes sets of artifacts obtained each month m from the months January to December, twelve example models can be built and/or trained by the trainer 113, with each model being trained on one set of artifacts obtained during one month from the twelve months. As an example, the ML model 112 can include a ML model (Mm) trained on data from month m, where m can be 1 to 12, and the testing phase can include testing sessions where the artifacts (or samples) in each of the set of artifacts (or data sets) of the subsequent months are tested at each test session.

In some implementations, the ML model 112 can be a single ML model (e.g., a single neural network or a single decision tree model or a single random forest model) that can be trained with a first set of artifacts, designated to be training artifacts, received during a time period from a set of time periods. The single ML model 112 can then be evaluated for it performance, as described herein. Upon the evaluator 114 sending an indication to retrain, the single ML model 112 can be retrained, any number of times, using a suitable second (or third and so on) set of artifacts designated as training artifacts, different from the first set of artifacts. In some instances, the second (or third and so on) set of artifacts can include newly introduced artifacts received during a time period different from the time period during which the first set of artifacts was received.

As an example implementation, a neural network included in each of the models included in the ML model 112 can have a feed-forward architecture including 5 feed-forward layers (e.g., a COOL or a DOO network as described herein). The models Mm can each have the same architecture and hyperparameters (parameters set before training) during training sessions, resulting in a set of 12 trained models with entirely different data $M=\{M_{Jan17}; M_{Feb17}; \ldots M_{Dec\ 17}\}$. Each of the models is configured to be only aware about the kind of malicious artifact that was presented in the training dataset corresponding to that month. That is, if a malware campaign was first observed in month m, the models Mi<m would not have encountered a sample of that campaign during training.

The trainer 113 can be configured to monitor for an indication or trigger for retraining the ML model 112, for example an indication received from the performance evaluator 114 or from a human analyst. Upon receiving the indication to retrain, the trainer 113 can prepare a customized training data set of artifacts that includes artifacts that have been newly introduced since the last training phase and use the customized training data set including training artifacts to retrain the ML model 112 such that the ML model 112 improves in performance at classifying the newly added artifacts.

As described above, the ML model 112 can be or include a neural network configured to have an input layer, an output layer, and one or more hidden layers, as described in further detail herein. The neural network of ML model 112 can be configured to receive a feature vector, or a set of values associated with of a file in the form of an input vector, at the input layer, iteratively perform computations based on the inputs, using the one or more hidden layers, and output, via the output layer, an indication associated with classification of the file. For example, the neural network of ML model 112 can provide an output indicating a maliciousness classification of a file, and a confidence value associated with the maliciousness classification. The maliciousness classification can include information regarding whether a file is classified as a threat. The maliciousness classification can classify a file into different categories such as, for example, benign, potentially malicious, malicious content, type of malicious content, class of malicious content, malware family and/or the like.

In some embodiments, the ML model 112 can include a neural network configured to avoid overgeneralization when encountering new data that has never been encountered during training. In some embodiments, the neural network can implement a fitted learning framework. In some embodiments, the neural network can implement a "competitive overcomplete output layer" (COOL), as described in further detail below.

The ML model 112 can be configured to output confidence values associated with each indication or classification of a potentially malicious artifact. In some implementations, the confidence value can include a percentage measure of confidence associated with the determination of the classification of maliciousness (e.g., a 90% confidence that an artifact is classified as malicious or classified as a specific type of malware). The ML model 112 can be configured to determine the classification of a given artifact and the confidence associated with the determination and send the classification and the confidence value to the performance evaluator 114 to be analyzed and evaluated for ongoing performance and considered for retraining.

A confidence value can be generated based on any suitable method. In some implementations, one or more distance measures can be used to generate a measure of likeness or similarity to known artifacts and the confidence value can be estimated based on the measure of likeness. In some instances, a set of feature representations associated with an artifact can be used to calculate a distance measure. For example, features can be the length of an artifact (e.g., a file), counts of occurrences of a particular set of strings, abstract representations of statistical parameters associated with the artifact (e.g., one or more principal components representing text string in an artifact, etc., which can be parsed by analyzing individual sections of an artifact. In some implementations the parsing of the features can be format agnostic, such as calculating the entropy of an artifact (e.g., a file). These feature representations can be viewed as points in high-dimensional space, locating a specific artifact, and distances can be computed between the feature representations of different artifacts, using such metrics as the Euclidean distance $d(xi; xk)=\|xi-xk\|^2$. In some implementations, other suitable methods can be used to calculate a measure of uncertainty associated with a determination of a classification of an artifact as malicious, which can be used to determine the confidence value associated with the classification. For example, methods disclosed in the manuscript by R. E. Harang and E. M. Rudd, entitled "*Principled uncertainty estimation for deep neural networks*," published in CoRR, vol. abs/1810.12278, 2018 (also referred to herein as the "Harang and Rudd, 2018 manuscript") can be used to determine a measure of uncertainty associated with a determination of a classification of an artifact from a test data set, the entirety of which is incorporated by reference herein, in its entirety for all purposes. For example, one or more types of uncertainty can be used, for example: model capacity uncertainty, intrinsic data uncertainty, and open set uncertainty. A unified hierarchical model can be used, which combines methods from Bayesian inference, invertible latent density inference, and discriminative classification in a single end-to-end deep neural network topology to yield efficient per-sample uncertainty estimation.

In some implementations, a confidence value can be estimated using one or more methods of identifying extreme values, using an extreme value machine configured to indicate when inputs to a ML model trained in a supervised manner correspond to classes unseen at training time. In some implementations, the methods disclosed in the manuscript by E. M. Rudd, L. P. Jain, W. J. Scheirer, and T. E. Boult, entitled "The Extreme Value Machine," published at arXiv preprint, 2015, can be used to determine a confidence value associated with a classification of a potentially malicious artifact by the ML model 112.

In some implementations, the confidence values can be used to evaluate performance of an ML model by evaluating how statistically different a set of artifacts are when compared to another set of artifacts (e.g., artifacts associated with high confidence values). The evaluator 114 described can evaluate classification of a set of artifacts that are unlabeled (i.e., without any indication of known classification of the artifacts and/or error rates associated with the classification of the artifacts) and send an indication to retrain the ML model 112 based on detection of statistically distant or new artifacts different from the training artifacts that the ML model 112 was trained on. Thus, the evaluator 114 does not depend on an availability of labelled data with known examples of a class of malware, which can be challenging to obtain for new malware campaigns (e.g., not available in a timely manner or resource intensive to generate labelled data) to evaluate model performance and/or send an indication to retrain.

In some instances, the neural network 112 can have connected nodes in different layers (for example, input layer, hidden layer(s) and/or output layer) of the neural network 112. The input layer 240 can include one or more input nodes 241 configured to receive an input vector (e.g., feature vector 247) associated with a set of features extracted from a file (e.g., file 123 indicated in FIG. 1). The input vector can be, in some implementations, a set of values associated with the file as described herein. For example, the neural network 112 can perform one or more tasks such as, for example, performing content classification, performing behavior classification, categorizing different file types, classifying different image types and/or the like. Content classification and behavior classification can be used, for example, to identify the likelihood that a file or a behavior is associated with a security threat (e.g., malware).

Figure 2:
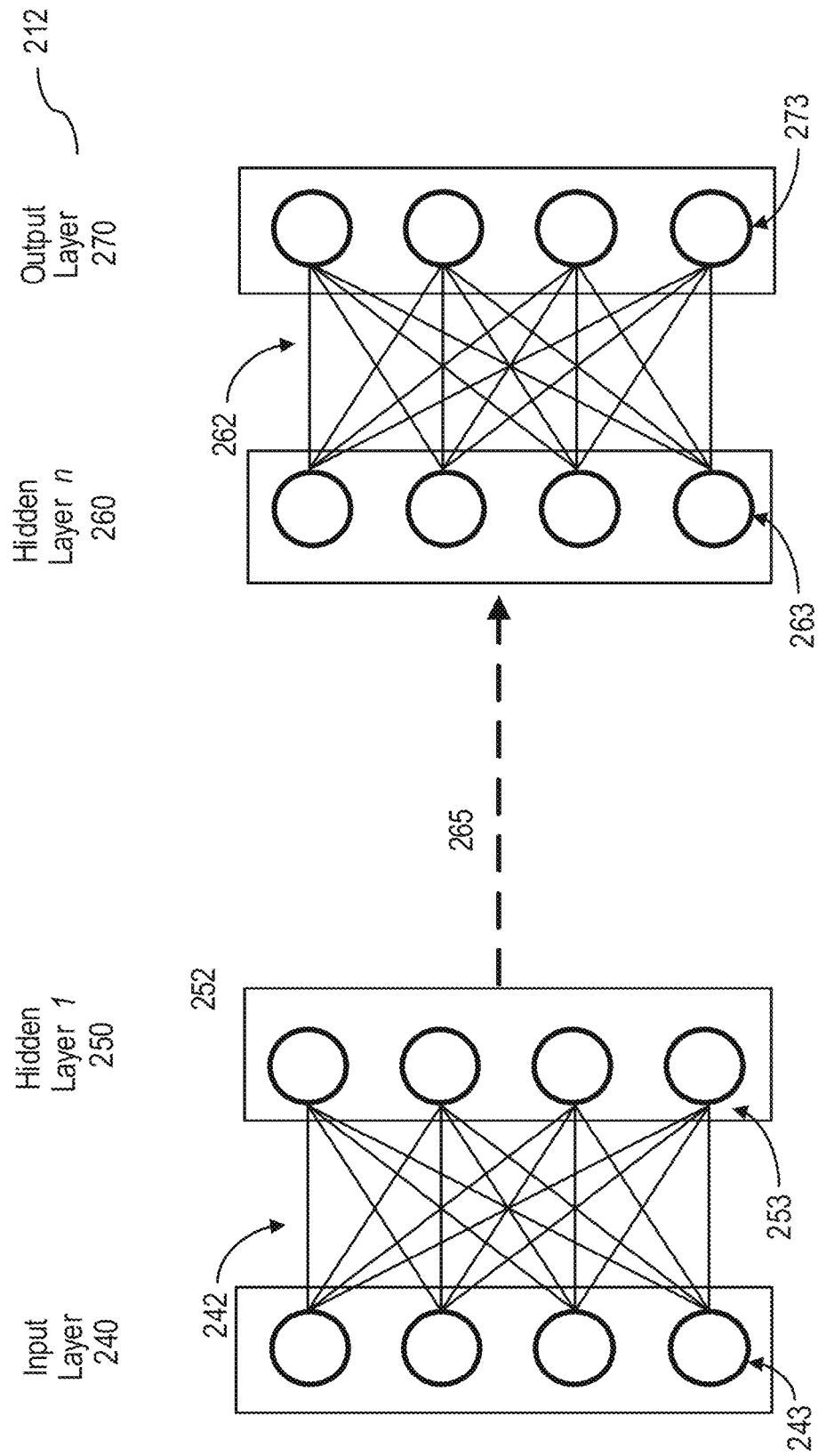
FIG. 2 is a schematic representation of a neural network, according to an embodiment.

FIG. 2 is a block diagram representation of a neural network 212, according to an embodiment. The neural network 212 can be a part of a MCM device such as the device 100 described with respect to FIG. 1. The neural network 212 can be the same as or substantially similar to the neural network included in ML model 112 described above with respect to the device 100. For example, the neural network 212 can include an input layer 240, one or more hidden layers 250, 260, and an output layer 270. The input layer 240 includes input nodes 253, each hidden layer 250, 260 includes nodes 253 and 263, respectively, and the output layer 270 includes output nodes 273, as shown in FIG. 2. The input layer 240, the hidden layers 250, 260, and the output layer 270 can be connected by interlayer connections 242, 253, 265, and 262 respectively.

Figures 3A, 3B:
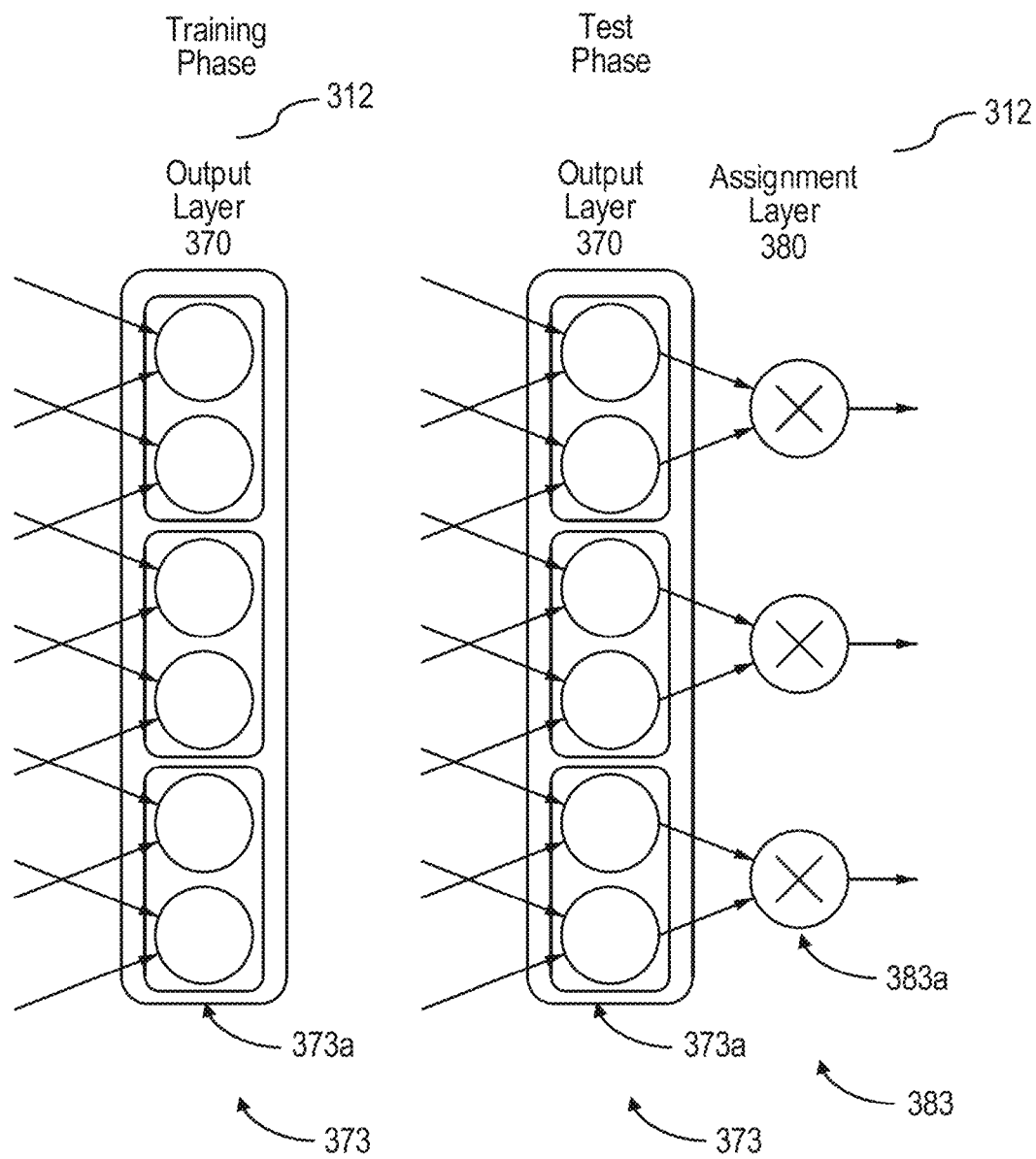
FIGS. 3A and 3B are block diagram representations of a portion of a neural network during training phase and during testing phase, respectively, according to an embodiment.

FIGS. 3A and 3B are block diagram representations of a portion of a neural network 312 during training phase and during test phase, respectively, according to an embodiment. The neural network 312 can be a part of a MCM device such as the device 100 described with respect to FIG. 1. The neural network 312 can be the same as or substantially similar to the neural network included in ML model 112 described above with respect to the device 100 and/or the neural network 212 described above with reference to FIG. 2. For example, the neural network 312 can include an input layer (not shown in FIGS. 3A and 3B), one or more hidden layers (not shown in FIGS. 3A and 3B), and an output layer 370 including output nodes 373 as shown in FIGS. 3A and 3B. In some embodiments, the neural network 312 can be configured to avoid overgeneralization when encountering new data that has never been encountered during training by implementing a fitted learning framework by using a "competitive overcomplete output layer" (COOL). In such embodiments, during training two or more output nodes or units can be configured to be grouped together as indicated by boxed units 373a in the output layer 370 in FIG. 3A. During testing phase, as shown in FIG. 3B, the neural network 312 can include an assignment layer 380 with aggregate operators 383, downstream of the output layer 370. An aggregate operator, also referred to as a neuron aggregate, can be defined as a collection of output units or output nodes in the network, called member units, which attempt to learn the same concept. The aggregate operators 383 can be configured to assign more than one output to each of the possible classes of a classifier while, at the same time, forcing those outputs to compete with each other. As shown in FIG. 3B, output nodes within a box 373a can be forced to feed into the aggregate operator 383a. Forcing this competition in the output layer 370 of the neural network 312 produces a partitioning of the input space where the outputs agree in the regions of the input space that are close to the training instances. In some embodiments, at testing phase, the output of the units within a neuron aggregate can be combined through multiplication to obtain the final predictions. This assignment can allow the ML model to implement a classifier that can learn to differentiate between classes, while capturing the distribution of the training instances of each class at the same time. One way of implementing the competition between member units is to use a softmax layer on top of the member units of the neuron aggregates. Because of the nature of the softmax function—if one output is larger, the remaining outputs are necessarily smaller—the member units of the same neuron aggregate are competing against each other. The number of member units per class w is the degree of over-completeness (DOO) of the network.

During training of the network, the member units of the same neuron aggregate are trained with the same value $-0$ if the label is not from the same class as the neuron aggregate and $1=w$ otherwise. At inference time the outputs of the member units of the same class are combined via multiplication to obtain the final output. To produce a probability estimate for each of the classes, each aggregate output can be multiplied by $w^w$. With fitted learning, the sum of the outputs, even after re-normalization, do not necessarily add up to one. In some instances, the confidence c of a model for a given sample, is the sum of the outputs of the network. This magnitude can be interpreted as the total amount of probability mass that the model is assigning to any class for the sample. The maximum possible value of c is obtained when the outputs for a given neuron aggregate are $1=w$, resulting in an estimated probability for the given class of one. Both samples that are close to the decision boundary and those that are far from the training distribution will end up having low confidence scores.

Returning to FIG. 1, the performance evaluator 114, also referred to herein as "the evaluator", can be configured to receive the confidence values generated by the output of the ML model 112, analyze the confidence values by generating one or more aggregate values, calculate one or more confidence metrics based on one or more aggregate values, and evaluate the performance of the ML model 112 at classifying the artifacts by comparing the confidence metrics against one or more threshold criteria. The evaluator 114 is configured to send, based on the comparison of the one or more confidence metrics and the one or more criteria, an indication to retrain the ML model 112 or to schedule the retraining of the ML model 112 (e.g., advance or postpone a scheduled retraining phase). In some implementations, the evaluator 114 can use the confidence metrics to evaluate methods to retrain the ML model 112. For example, based on the confidence metrics associated with a particular set of artifacts the evaluator 114 can use a particular set of artifacts (e.g., artifacts statistically similar to the ones associated with the confidence metrics) in the training data set to retrain the ML model 112 to improve performance with respect to the set of artifacts with the confidence metrics that triggered the retraining.

It should be noted that, as described above, the evaluator 114 described can evaluate classification of a set of artifacts that are unlabeled (i.e., without any indication of known classification of the artifacts and/or error rates associated with the classification of the artifacts) and send an indication to retrain the ML model 112 based on detection of statistically distant or new artifacts different from the training artifacts that the ML model 112 was trained on. Thus, the evaluator 114 does not depend on an availability of labelled data with known examples of a class of malware, which can be challenging to obtain for new malware campaigns (e.g., not available in a timely manner or resource intensive to generate labelled data) to evaluate model performance and/or send an indication to retrain.

In some embodiments, the performance evaluator 114 can receive an indication of one or more threshold criteria to evaluate the confidence values associated with a classification of a set of artifacts by the ML model 112. In some implementations, the evaluator 114 can receive the threshold criteria from a user or a human analyst. In some implementations, the evaluator 114 can analyze a set of artifacts and confidence values associated with the artifacts and generate suitable criteria. In some implementations, the evaluator 114 can be configured to calculate a confidence metric associated with a set of artifacts in a test data set. For example, each model included in an ML model 112 can be tested using several sets of artifacts that were received during each time period from a set of time periods. The evaluator 114 can calculate a confidence metric associated with each set of artifacts from the several sets of artifacts such that each confidence metric is calculated for each time period from the set of time periods based on the confidence value associated with each artifact from the set of artifacts received during that time period.

In some instances, the confidence metric can be based on a calculation of a number artifacts from the set of artifacts that have a confidence value above a confidence value threshold (e.g., number of artifacts that have a confidence value above 90% confidence from a set of artifacts in data obtained during a timer period). In some instances, the confidence metric can be based on a number artifacts from the set of artifacts that have a confidence value below a confidence value threshold (e.g., number of artifacts that have a confidence value below 70%). In some implementations, the evaluator 114 can be configured to calculate a confidence metric associated with a set of artifacts from a time period in a test data set based on a calculation of a percentage or proportion of artifacts from a set of artifacts (e.g., 20% of the artifacts from a set of artifacts or $1/5^{th}$ of a set of artifacts) that have a confidence value above a confidence value threshold (e.g., normalized percentage or proportion of artifacts in a set that have a confidence value above 90% confidence from a set of artifacts in data obtained during a time period. For example, the confidence metric associated with a time period can be a percentage associated with (1) a number of artifacts from the set of artifacts received during that time period that have a confidence value above a confidence value threshold and (2) a total number of artifacts from the set of artifacts received during that time period. In some implementations, the confidence metric associated with a time period can be a percentage or proportion of artifacts from the set of artifacts that have a confidence value below a confidence value threshold (e.g., normalized percentage or proportion of artifacts in a given set that have a confidence value below 70%).

In some instances, the criteria can include one or more high confidence criteria and one or more low confidence criteria. For example, following receipt of a set of artifacts received during a time period from a set of time periods, by the ML model 112, the evaluator 114 can receive, for each artifact of the set of artifacts, an indication of whether that artifact is malicious and a confidence value associated with the indication of whether that artifact is malicious. In some implementations, the evaluator 114 can be configured to compare the confidence value for each artifact from the set of artifacts to a high confidence criterion to identify a number of artifacts that have confidence values that meet the high confidence criterion. In some implementations, the evaluator 114 can be configured to compare the confidence value for each artifact from the set of artifacts to a low confidence criterion to identify a number of artifacts having confidence values that meet the low confidence criterion. In some implementations, the evaluator 114 can group the artifacts from the set of artifacts that have confidence values that are neither above a high confidence criterion nor below a low confidence criterion into a category of artifacts that can be suitably used to evaluate a performance of the ML model 112. In some instances, as described above, the evaluator 114 can evaluate a number and/or percentage of artifacts associated with confidence values above a high confidence criterion and the number and/or proportion of artifacts below a low confidence criterion. In some implementations, the evaluator 114 can send an indication to retrain the ML model 112 based on the high confidence criterion being met. In some implementations, the indication to retrain can be based on the low confidence criterion being met. In some implementations, the evaluator 114 can send the indication to retrain when both the high and the low confidence criteria are met. In some instances, the indication to retrain can be sent when the first one of the two criteria is being met and a second indication can be sent when the second criterion is also met (e.g., an indication for review by a human analyst).

In some implementations, the ML model 112 may be trained at a first time to classify a potentially malicious artifact with a known (labelled) classification of maliciousness, and tested with test data sets including several sets of artifacts over several (two or more) subsequent test phases. The evaluator 114 can be configured to analyze the performance of the ML model 112 at each of the subsequent sessions, in which the ML model 112 indicates a classification of a set of artifacts and confidence values associated with the classification of each artifacts from the set of artifacts. The evaluator 114 can analyze the performance of ML model 112 by analyzing the confidence values associated with each indication. For example, in some implementations the ML model 112 may be trained at a first time, using a training data set including a set of artifacts from January, to classify a potentially malicious artifact with a known (labelled) classification of maliciousness. The ML model 112 can be tested with test data sets including eleven sets of artifacts each set of artifact obtained during a particular month from the months February to December, the testing being carried out over several test sessions following the training phase. The evaluator 114 can be configured to analyze the performance of the ML model 112 at each of the test phases by analyzing the confidence values associated with indications of classification, and/or the comparison of confidence values against a high/low confidence criterion, of the artifacts from the set of artifacts tested at a particular test session. Evaluator 114 can be configured to compare and or consider changes in the distribution of confidence values (e.g., changes in distribution of confidence values that are lower than a low confidence threshold criterion) over time (e.g., over the subsequent several months following training of the ML model 112). The evaluator 114 can send an indication to retrain the ML model 112, upon a high confidence or a low confidence criterion being met, to distinguish artifacts based on dissimilarity in their statistical features using additional training artifacts that may or may not be labelled.

In some examples, ML model 112 can include multiple models each model being trained on a different set of artifacts used as training data set. For example, given a data set that includes sets of artifacts obtained each month m from the months January to December, twelve example models can be built each model being trained on one set of artifacts obtained during one month from the twelve months. As an example, the ML model 112 can include a ML model (Mm) trained on data from month m, where m can be 1 to 12, and the testing phase can include testing sessions where the artifacts (or samples) in each of the set of artifacts (or data sets) of the subsequent months are tested at each test session. Confidence values that the ML model 112 assigns to each of the artifacts are obtained.

As an illustrative example, using a model trained with data including a set of artifacts obtained during January, the data including artifacts obtained from subsequent months Febrary-December are tested from that model's perspective. The model trained on artifacts from February is tested with samples of artifacts from March to December, etc. In some implementations, an evaluator 114 can define one or more confidence classes or confidence buckets with defined ranges of confidence values assigned by the ML model 112. For example, the evaluator can use three confidence buckets: low confidence including confidence values c<=0.1; medium confidence bucket including confidence values (0.1<c<0.9) and high confidence bucket with confidence values c>0.9. The low confidence bucket can include confidence values associated with artifacts that are substantially different from the bulk of training data because they are new to the model or variants with large statistical differences from the artifacts the model was trained on, or artifacts that are close to a decision boundary. High confidence samples can be similar—from the models perspective—to samples encountered during training from the training set. In some instances, some of the artifacts in the test set assigned with high confidence values can be near-duplicates of one or more artifacts encountered in the training set. In some instances, some of the artifacts in the test set assigned with high confidence values can be hashbusters, file infectors applied to different files, files with large amounts of "borrowed" code, etc., for example.

As described above, in some implementations, following each test session, the evaluator 114 can be configured to use one or more confidence metrics to assess the performance of the ML model 112. For example, the evaluator 114 can calculate a first confidence metric, based on the number of artifacts that were associated with a confidence value above a high confidence criterion. As an example, the first confidence metric can be a percentage or a fraction of the number of artifacts with confidence values higher than a high confidence threshold criterion of the total number of artifacts in the set of artifacts used during that test session. In some implementations, the evaluator 114 can calculate a second confidence metric based on the number of artifacts with confidence values below a low confidence criterion. As an example, the second confidence metric can be a percentage or a fraction of the number of artifacts with confidence values lower than a low confidence threshold criterion and the total number of artifacts in the set of artifacts used during that test session.

In some implementations, the evaluator 114 can perform analyses of trends in the performance of data to evaluate a rate of change in the performance of the ML model over time. For example, the evaluator 114 can perform regression analyses to determine a rate of decay in the performance of ML model 112 as indicated by a positive slope associated with a rate of increase in the percentage of artifacts associated with low-confidence values. As an example, the evaluator 114 can calculate a metric that indicates a rate of increase associated with a percentage of artifacts that have confidence values lower than a low-confidence threshold criterion. The evaluator 114 can be configured to send an indication to retrain the ML model 112 in response to the metric meeting a retraining criterion. For example an indication to retrain the ML model 112 can be sent in response to the rate of increase in the percentage of low-confidence values being higher than a predetermined threshold value (e.g., 1%.)

As another example, the evaluator 114 can perform regression analyses to determine a rate of decay in the performance of ML model 112 as indicated by a negative slope associated with a gradual decrease in the percentage of artifact associated with high-confidence values. For example, the evaluator 114 can calculate a metric that indicates a rate of decrease associated with a percentage of artifacts that have confidence values higher than a high confidence threshold criterion. The evaluator 114 can be configured to send an indication to retrain the ML model 112 in response to the metric meeting a retraining criterion where the rate of decrease in the percentage of high-confidence values is found to be higher than a predetermined threshold value (e.g., 4%)

Figure 5B:
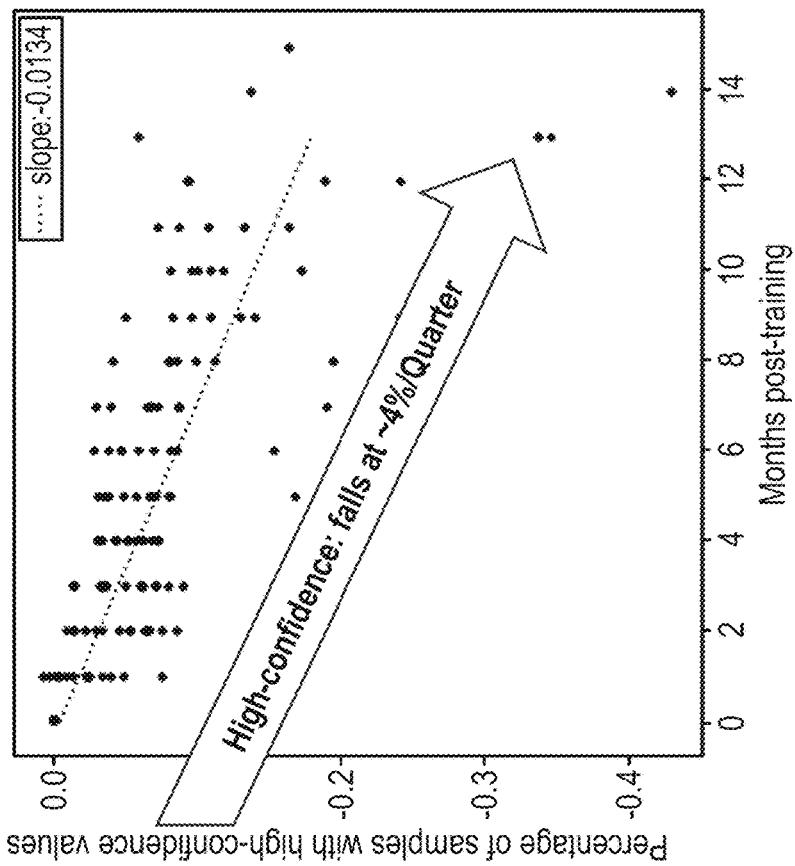
FIGS. 5A and 5B are charts illustrating changes in performance of an ML model, indicated by changes over time in a set of low confidence values and a set of high confidence values output by the ML model, respectively, as measured using an MCM device, according to an embodiment.
Figure 5A:
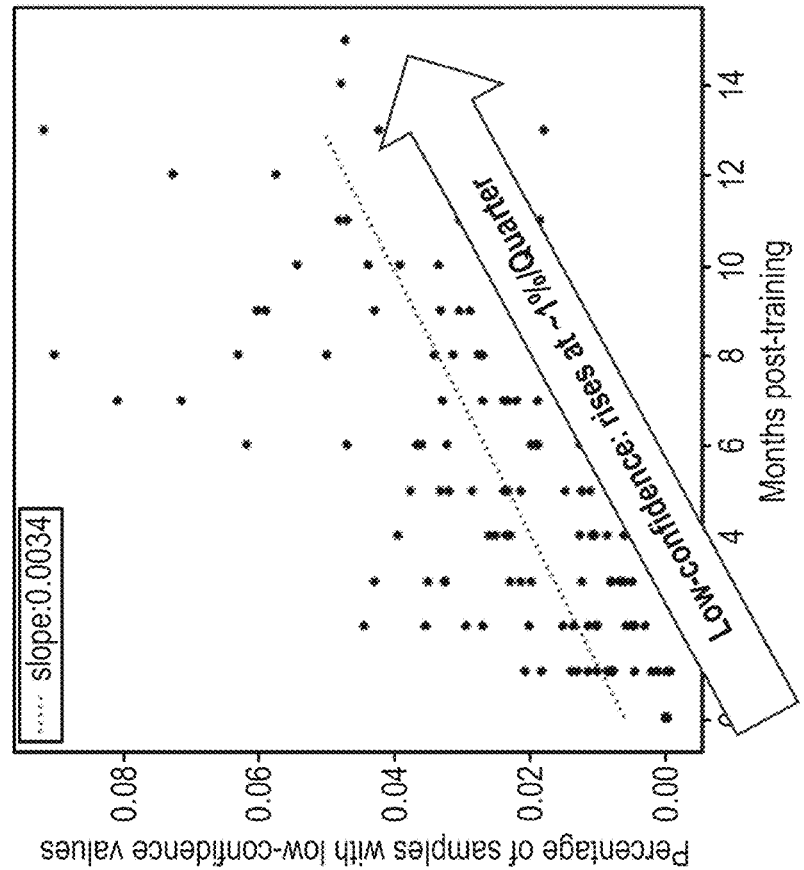

FIG. 5A shows an example chart 500A plotting the confidence metrics calculated from test sessions conducted at time periods subsequent to training, by an evaluator in an MCM device, according to an embodiment. The confidence metrics in the example shown in FIG. 5 are percentages of low-confidence values below a low confidence threshold criterion, shown as a function of time post training. Said in another way, FIG. 5A shows the percentage of artifacts (represented as black circles) that were associated with a confidence value that was lower than a predetermined low confidence threshold criterion, at each test session of a set of test sessions, conducted over 14 months following a training of an ML model at month 0. As indicated, the chart shows a gradual increase in the percentage of artifacts that were assigned a low-confidence value below the low-confidence threshold criterion. This indicates a creep up of failures in accurate classification of potentially malicious artifacts with a high confidence of classification, indicating a decay in performance of the ML model over time. As shown in FIG. 5A the regression fit, indicated by dashed line 544a, of the percentage values over time with a positive slope of −0.0034 indicates the gradual increase in the percentage of artifact associated with low confidence values which in turn indicates a rate of decay in the performance of the model.

FIG. 5B shows an example chart 500B plotting the percentage of artifacts that were associated with a confidence value that was higher than a predetermined high confidence threshold criterion, at each test session of a set of test sessions, conducted over 14 months following a training of an ML model at month 0. As indicated, the chart 500B shows a gradual decrease in the percentage of artifacts that were assigned a high-confidence value above the high-confidence threshold criterion. FIG. 5B also shows the regression fit, indicated by dashed line 544b, of the percentage values over time with a negative slope of −0.0134 representing the rate of decay in the performance of ML model used as indicated by the negative slope associated with a gradual decrease in the percentage of artifact associated with high-confidence values. This indicates a gradual decay in the high performance of the ML model used.

In some implementations, the evaluator 114 can be configured to compute one or more aggregate measures based on the confidence metric(s). For example the evaluator 114 can compute one or more aggregate measures based on the number and/or percentage of artifacts below a low confidence criterion. For example, in some implementations, the evaluator 114 can be configured to compute any suitable statistic such as a confidence metric associated with the confidence values. For example, the evaluator 114 can compute a mean, median or any other suitable average statistic and/or a standard deviation based on the number and/or the confidence values associated with the artifacts found to be above a high confidence criterion.

In some implementations, the evaluator 114 can be configured to generate and/or send to the trainer 113 and/or a human analyst, based on the confidence metric(s) and/or trend analyses described above, an indication whether or not to retrain the ML model 112. In some instances, the evaluator 114 can be provided one or more retraining criteria to on which to base a decision to retrain the ML model 112. For example, in some implementations the evaluator 114 can be configured to evaluate a set of confidence metrics or metrics associated with at least one of a number of artifacts having confidence values that meet a high confidence criterion or a number of artifacts having confidence values that meet a low confidence criterion, which in turn can meet a retraining criterion. The evaluator can send an indication to retrain the ML model 112 in response to the metric associated with at least one of the number of artifacts having confidence values that meet the high confidence criterion or the number of artifacts having confidence values that meet the low confidence criterion meeting a retraining criterion.

In some implementations, the retraining criteria can include a high retraining threshold and/or a low retraining threshold. For example, the evaluator 114 can generate an indication to retrain the ML model 112 based on a metric that can be associated with a number of artifacts having confidence values that meet a high confidence criterion and a retraining criterion is a high retraining threshold (e.g., fewer than a predetermined percentage of artifacts have a confidence value above the high retraining threshold). In some implementations, the evaluator 114 can generate an indication to retrain the ML model 112 based on a first metric that can be associated with the number of artifacts having confidence values that meet a low confidence criterion (e.g., greater than a predetermined percentage of artifacts have a confidence value below the low retraining threshold). Additionally, the retraining criterion can be met based on a value for the above mentioned first metric being below a high retraining threshold and a value for a second metric associated with the number of artifacts having confidence values that meet the low confidence criterion being below a low retraining threshold. In some implementations, the retraining criterion can be met based on a value for the first metric being below a high retraining threshold and/or a value for a second metric associated with the number of artifacts having confidence values that meet the low confidence criterion being below a low retraining threshold.

The metric can be any suitable metric calculated to assess model performance over a set of time periods. In some instances the metric can be based on the confidence metrics and/or trends in the confidence metrics (e.g., a negative slope associated with a gradual decrease in the percentage of artifact associated with high-confidence values, or a positive slope associated with a gradual increase in the percentage of artifact associated with low-confidence values) based on which the evaluator 114 can generate an indication to retrain the ML model.

In some implementations, the evaluator 114 can use one or more retraining criteria or retraining threshold values to determine whether to retrain or not. For example, evaluator 114 can receive a high retraining threshold criterion and/or a low retraining threshold criterion from a user. The evaluator 114 can send an indication to retrain the ML model 112 based on a retraining criterion being met based on a confidence metric (e.g., a percentage of artifacts associated with low confidence values) being above a low retraining threshold (e.g., more than 4% of artifacts having confidence values lower than the low confidence criterion). In some implementations, the evaluator 114 can send an indication to retrain the ML model 112 based on a retraining criterion being met based on a confidence metric (e.g., a percentage of artifacts associated with high confidence values) being below a high retraining threshold (e.g., less than 80% of artifacts having confidence values higher than the high confidence criterion).

In some implementations, the evaluator 114 can send an indication that can directly cause the trainer 113 to use the appropriate training data set (including the artifacts causing the decay in model performance) to retrain the ML model 112 (or one or more models included in the ML model 112). In some instances, the evaluator 114 can send an indication to the trainer to schedule a retraining of the ML model 112 (e.g., postpone a scheduled training session based on metrics from evaluations of the performance of the ML model 112 not reaching or crossing retraining criteria). In some instances, the evaluator 114 can generate one or more summaries from analyses evaluating model performance and send the summaries and/or indications to a human analyst for further review and/or consideration. For example, in some instances, the evaluator 114 may encounter few artifacts with very low confidence (indicating that the artifacts may be newly introduced and potentially malware) but the percentage of artifacts with low confidence may be low enough such that the retraining criterion is not yet met, or the confidence values associated with the artifacts may be close to the low confidence threshold but not crossing the threshold. In such instances, the evaluator 114 may flag the artifacts in question and present the flagged artifacts to a human analyst for further consideration.

While shown in FIG. 1 as an MCM device 100 including a processor 110 that includes the feature extractor 111, a machine-learning (ML) model 112, a trainer 113, and a performance evaluator 114, in some embodiments the feature extractor 111, machine-learning (ML) model 112, and trainer 113 can be included in a first processor and the performance evaluator 114 can be included in a second processor different from the first processor. In some embodiments, the MCM device can include only the performance evaluator 114, while the feature extractor 111, a machine learning (ML) model 112, and trainer 113 are included in a separate device that may be operatively coupled to the MCM device (e.g., via a network).

In use, the processor 110, included in the MCM device 100, can be configured to receive a set of artifacts (such as, for example, artifact 123, 133) belonging to a set of artifacts (such as, for example, set of artifacts 122, 132) from the memory 120. The feature extractor 111, included in and/or executed by the processor 110, can be configured to receive each artifact from the set of artifacts and extract a set of features from that artifact (or otherwise identify a set of values associated with the file) to define a feature vector associated with that artifact. That feature vector can be stored in the memory 120 and used as the representation of that artifact. Each set of artifacts can be used to generate a set of feature vectors. The processor 110 can then be configured to provide the stored feature vector from the memory 120 to the ML model 112 (e.g., a neural network).

The trainer 113 can receive the feature vector and use the feature vector to train the ML model 112 at a first time. The trainer 113 can use a portion of the artifacts in the memory 120, (e.g., one of the sets of artifacts) in the memory 120 to train the ML model and a portion of the artifacts (e.g., one or the sets of artifacts) to test the ML model 112. The trainer 113 can use any suitable strategy to train the ML model 112 (e.g., any suitable supervised or training algorithm such as a back propagation algorithm).

Following training, the ML model 112 can be configured to receive a set of artifacts received during a time period (the set of artifacts being one from several sets of artifacts received during a set of time periods), analyze the feature vector associated with each artifact from the set of artifacts and determine a classification associated with the artifact and a confidence value associated with the artifact. The confidence value for each artifact from the set of artifacts received during each time period from the set of time periods can be associated with a degree of similarity of that artifact with a set of training artifacts used to train the machine learning model.

The processor 110 can be configured to store the determined classification and the confidence value in the memory 120. For example, an ML model can output a maliciousness classification for the artifact to indicate whether the artifact is malicious or benign (e.g., classify the file as benign or malicious; classify the file as a type of malware, etc.).

The evaluator 114 can receive the confidence values associated with the artifacts classified by the ML model 112. The evaluator 114 can receive one or more confidence threshold criteria and compare the confidence values against the confidence threshold criteria. Based on the comparison, the evaluator 114 can generate one or more confidence metrics and/or trends associated with confidence metrics indicating performance of the ML model analyzed over time. The evaluator 114 can receive one or more retraining threshold criteria and, based on the confidence metrics, evaluate if one or more of the retraining threshold criteria have been met. The evaluator 114, based on one or more of the retraining criteria being met, can send an indication to the trainer 113 and/or an analyst to retrain the ML model 112.

Figure 6:
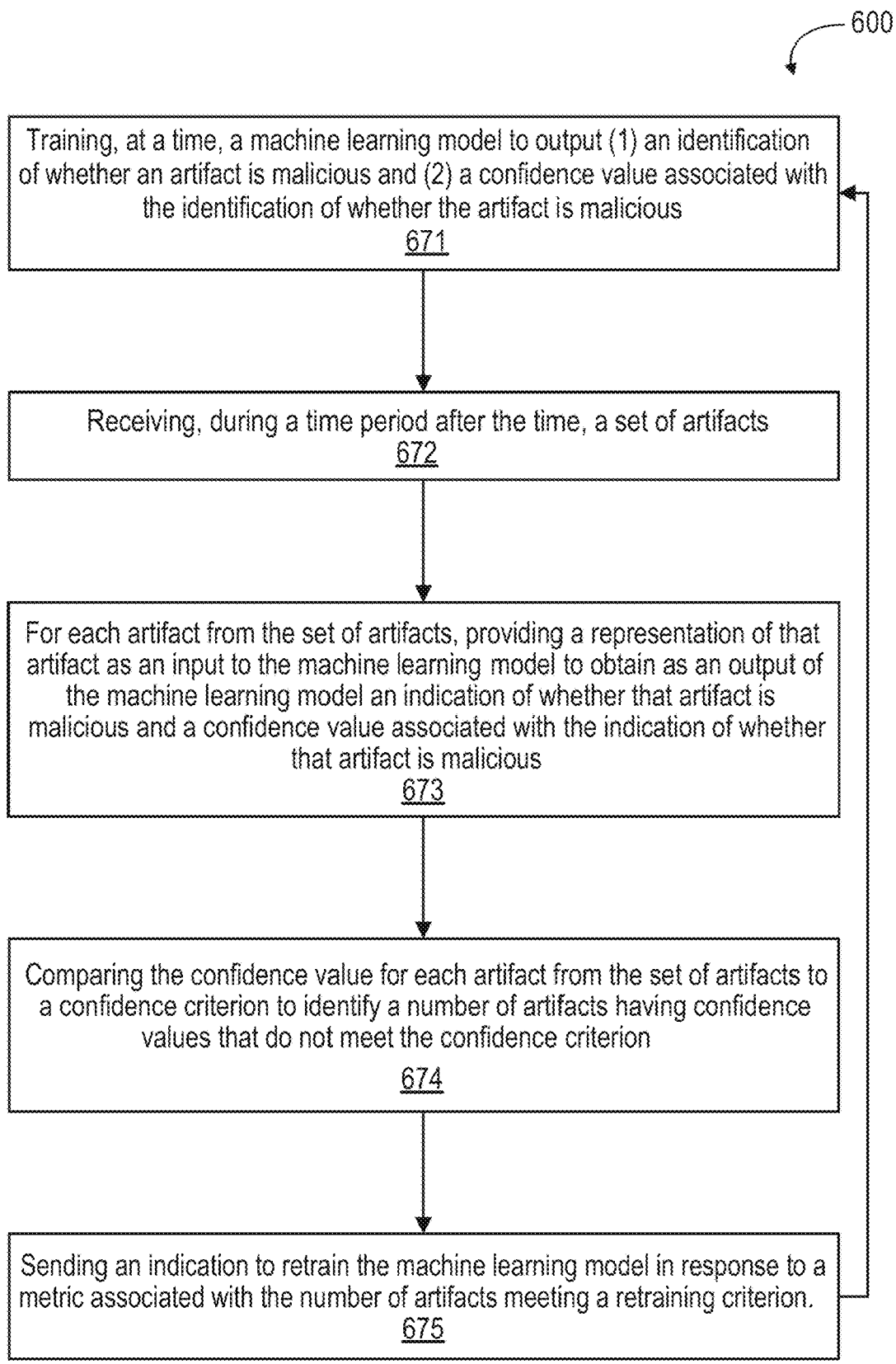
FIG. 6 is a flowchart illustrating a method for management of evaluating a performance of an ML model to classify one or more artifacts based on maliciousness by retraining the ML model based on the evaluation, using an MCM device according to an embodiment.

FIG. 6 is a flowchart describing a method 600 of use of an MCM device to manage a performance of an ML model in response to changes in the landscape of potentially malicious artifacts. The method 600 can be implemented by an MCM device substantially similar to the MCM device 100 described above with reference to FIG. 1. For example the method 600 can be implemented by the processor 110 of the MCM device 100 with the one or more portions of the processor 110 (e.g., the feature extractor 111, the ML model 112, the trainer 113 and the evaluator 114) performing one or more steps of the method 600.

At 671, the method 600 includes training, at a time, a machine-learning model to output (1) an identification of whether an artifact is malicious and (2) a confidence value associated with the identification of whether the artifact is malicious. As described herein, the machine-learning model can be a neural network and the neural network can be trained, using data including sets of artifacts, during a training phase that includes training sessions. In some implementations, the ML model can include a neural network and a classifier, and the neural network and the classifier can be trained, using data including sets of artifacts, during a training phase that includes training sessions. In some implementations, the ML model can include a set of ML models (e.g., neural networks) each ML model being trained, during a training session, on a set of training artifacts received during a time period from a set of time periods. At a training session, a trainer can build and train the ML model to learn decision boundaries to distinguish between artifacts from a set of artifacts that may belong to different classes of potential maliciousness. In some implementations, the ML model can be configured to output an identification of a classification of an artifact based on a type of maliciousness associated with the artifact and a confidence value associated with the identification of classification. As described above with reference to the components of the processor 110, the ML model can be configured to be a COOL network, or configured in any suitable manner to calculate the classification and the confidence value associated with the classification (e.g., using distance measures, information metrics, etc.)

At 672, the method 600 includes receiving, during a time period after the time, a set of artifacts. For example the MCM device implementing the method 600 and/or the ML model can be configured to receive data obtained after a training session, the data including artifacts from sets of artifacts corresponding to potentially malicious artifacts in circulation at various points or periods in time after the last training session (e.g., sets of artifacts obtained each month after a last training session).

At 673, the method includes providing, for each artifact from the set of artifacts, a representation of that artifact as an input to the machine learning model to obtain as an output of the machine learning model an indication of whether that artifact is malicious and a confidence value associated with the indication of whether that artifact is malicious. For example, a feature extractor (e.g., feature extractor 111) can extract a set of features from the artifacts and generate a feature vector that serves as a representation of the artifact, to be provided as input to the ML model. The ML model can output an indication of maliciousness or a class of maliciousness associated with the artifact, and a confidence value associated with the indication of maliciousness.

At 674, the method includes comparing the confidence value for each artifact from the set of artifacts to a confidence criterion to identify a number of artifacts having confidence values that do not meet the confidence criterion. As described above, with reference to the MCM device 100, an evaluator (e.g., evaluator 114) can receive the confidence values associated with a set of artifacts in a test session, and generate or receive a confidence criterion (e.g., from a user, human analyst or an external source) indicating a desired level of confidence for the performance of the ML model. The evaluator can compare the confidence values obtained from the ML model during the testing session with the confidence criterion to identify a number of artifacts that have confidence values that do not meet the confidence criterion (i.e., fall short of the desired performance of the ML model).

At 675, the method 600 includes sending an indication to retrain the machine-learning model in response to a metric associated with the number of artifacts meeting a retraining criterion. In some implementations, as described above, an evaluator of the MCM device implementing the method 600 can calculate one or more confidence metrics associated with the comparison of confidence values and the confidence criterion. In some implementations, the evaluator can perform any suitable analyses to measure trends associated with a change in the performance of the ML model as indicated by the trends in one or more confidence metrics over time or over different test sessions. In some implementations, the evaluator can receive one or more retraining criteria and based on an assessment of whether data associated with the one or more confidence metrics meets the one or more retraining criteria the evaluator of the MCM device can send an indication to retrain the ML model. For example the evaluator can flag the artifacts and send an indication to a human analyst to retrain the ML model. In some instances, the evaluator can automatically instruct a trainer (e.g., trainer 113) to retrain the ML model using the appropriate set of artifacts for training data also referred to as training artifacts. The steps 671 to 675 can be repeated for each batch of new sets of artifacts introduced in a landscape of potentially malicious artifacts to monitor and detect decay in the performance of the ML model and to update the performance by retraining the ML model to relearn decision boundaries by using data statistically similar to the artifacts inducing decay in performance.

As an example, analysis of ML-based malware detection based on WannaCry and HWorld families of malware was performed. In this experiment, detection and classification of samples including artifacts from two malware families from the year 2017: WannaCry and HWorld2 are presented. Particular focus is placed on the confidence that each of two ML models trained with monthly data assign to the samples from these two families. In the subset of data used for this experiment there are a total of 20,372 artifacts related to the WannaCry campaign and 138,429 artifacts related to HWorld. The monthly counts for each of the families is shown in Table 1 and the method to determine if a given artifact belongs to these families is defined in the Harang and Rudd, 2018 manuscript incorporated by reference in its entirety, above. Low confidence artifacts are defined to be those artifacts that are far from the training distribution of the model or close to the decision boundary between benign and malicious classes.

Table 1: Number of artifacts for WannaCry and H World malware in the sets of 3 million artifacts used for the experiment over time.

Figure 7A:
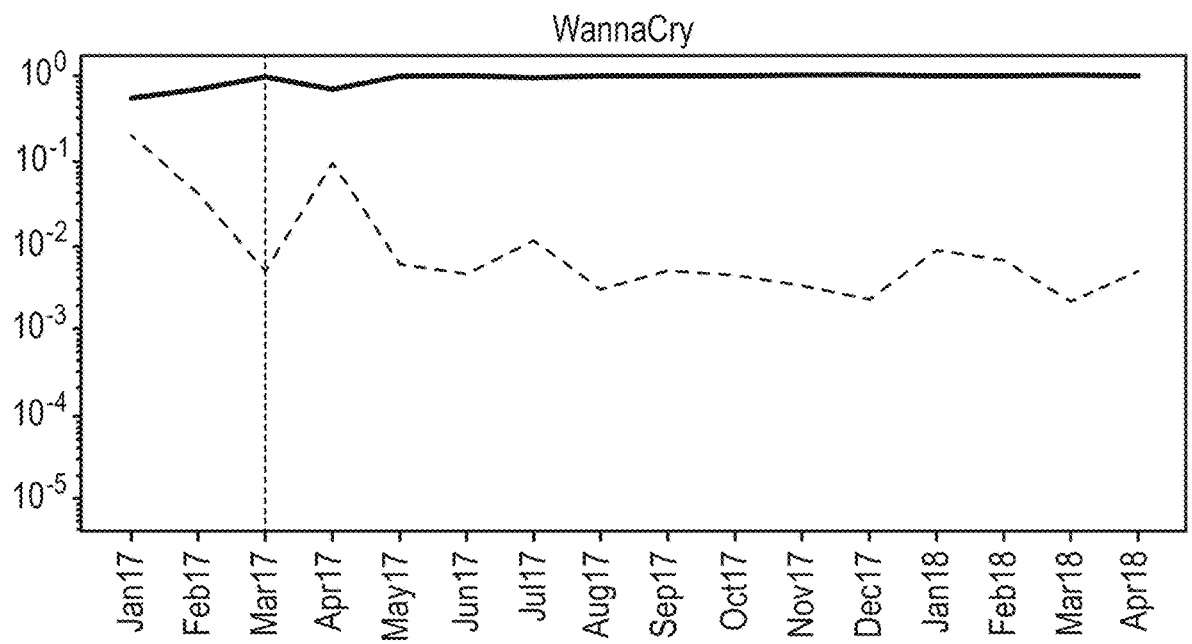
FIGS. 7A and 7B are charts illustrating performance of a set of machine learning models at detecting a first and second family of known malware, the models being trained on different sets of artifacts received during a set of time periods, using an MCM device, according to an embodiment.
Figure 7B:
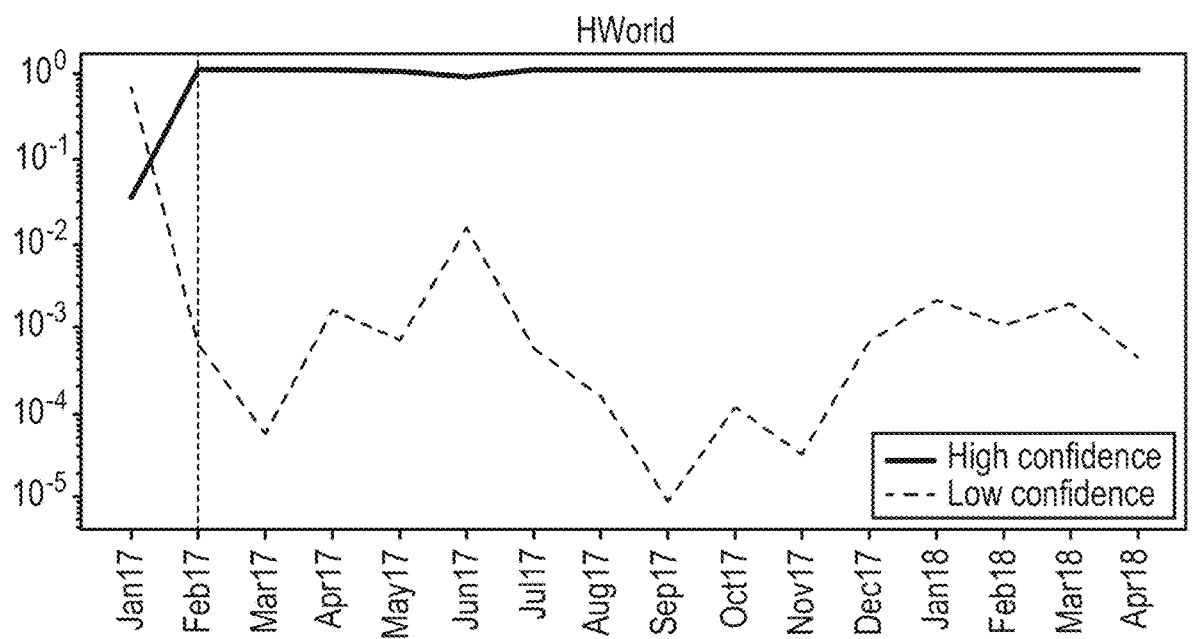

FIGS. 7A and 7B show the results of the above-described experiment. FIGS. 7A and 7B show charts 700A and 700B that plot percentage of values in high and low confidence categories, respectively. The chart 700A (FIG. 7A) shows the percentage of high confidence samples 754a and low confidence samples 755a for artifacts from the WannaCry family, when tested and scored with ML models trained using sets of artifacts from the different months of data. The chart 700B (FIG. 7B) shows percentage of high confidence samples 754b and low confidence samples 755b for artifacts from the HWorld family, when tested and scored with ML models trained using sets of artifacts from the different months of data (e.g., the January 17 model shown in the X-axis was trained using data including artifacts from January 17, the February 17 model shown in the X-axis was trained using data including artifacts from February 17, and so on). Dotted vertical lines indicate the first time a sample artifact for the given family was present in the training sets for an ML model. The ML models trained on sets of artifacts from January and February '17 did not encounter any instances of WannaCry during training. And the ML models trained using artifacts from January '17 did not encounter artifacts from the HWorld family during training. Nevertheless, the plots in FIGS. 7A and 7B show that 55.9% of the WannaCry artifacts were found to be high confidence when tested and scored using the ML model trained on January data. For those artifacts the detection rate is higher than 99.9% which suggests that (1) the machine learning approach generalizes well to unseen artifacts, (2) that the WannaCry campaign has features in common with previously known families, most likely previous Ransomware campaigns, which are well-attested to in the training data, and (3) the model confidence scores are empirically supported, given the high detection rate on the high confidence subset.

For the HWorld family (chart 700B in FIG. 7B) the results are slightly different. About 2.75% of the artifacts from this family are scored by the January '17 model as being high confidence, which suggests that the characteristics of the binary files from this HWorld campaign are substantially different than the features present in the January 2017 data. However if, as above, only those high-confidence artifacts from future months are classified, a true positive rate of 94.3% is obtained. The higher percentage of low confidence WannaCry artifacts compared with the percentage of low confidence artifacts in the HWorld campaign suggests a higher turnover in variants of the WannaCry family. Comparing the plots in FIGS. 7A and 7B with the counts in Table 1 it is observed that the number of artifacts that the ML model being trained can use to achieve a high percentage of high-confidence artifacts is relatively small. For example, the model trained in September 2017 encountered during training 6.7% (1,365) of WannaCry artifacts received during August 17, and 9% (12,583) of HWorld artifacts received during August 17, but was able to score as high confidence 97.65% of the WannaCry artifacts received during Septem-

|   | January 17 | February 17 | March 17 | April 17 | May 17 | June 17 | July 17 | August 17 |
|---|---|---|---|---|---|---|---|---|
| Wannacry | 0 | 0 | 1 | 12 | 542 | 1156 | 1461 | 1365 |
| HWorld | 0 | 207 | 10622 | 6294 | 2773 | 1801 | 10175 | 12583 |

|   | September 17 | October 17 | November 17 | December 17 | January 18 | February 18 | March 18 | April 18 | Total |
|---|---|---|---|---|---|---|---|---|---|
| Wannacry | 1267 | 908 | 2735 | 2153 | 1517 | 3090 | 2444 | 1721 | 20372 |
| HWorld | 5659 | 10273 | 7500 | 8285 | 6944 | 15031 | 23352 | 16870 | 138429 | ber 17 and 99.96% of the total HWorld artifacts received during September 17, as shown in FIGS. 7A and 7B, respectively.

While the examples provided above describe classification of maliciousness of a file, the disclosed devices and methods can be used for any kind of classification of any data such as image data, video data, voice data or text based data, numbers and counts based data and/or the like. For example, rather than and/or in addition to producing a maliciousness classification, the devices and methods disclosed herein can be used to classify images based on analysis of their content using one or more image characteristics that are captured. For example, the image characteristics can be color, gradient, smoothness, objects, object contours, etc. Based on analysis of the content using extracted characteristics the images can be classified as, for example, images of humans, animals, objects such as vehicles, weather patterns from radar outputs, etc. In other instances, the devices and methods described herein can be used to classify audio content, video content, text content, file type, and/or any other suitable events, objects, artifacts and/or data for any other suitable purpose, in addition to and/or instead of producing a maliciousness classification.

As an example, the MCM device 100 (shown and described with respect to FIG. 1) can be used to train and/or indicate to retrain ML model 112 to classify graphical content, such as, images, videos, graphs and/or the like. For example, the ML model 112 can classify images specific to and/or including animals (e.g., a dog, a cat and/or other types of animals), birds (e.g., a sparrow, a crow and/or other types of birds), vehicles, humans and/or the like. In other implementations, the MCM device 100 can be configured to indicate to retrain the ML model 112 to classify any other type of data, files, images, and/or the like in any suitable manner.

The devices and methods described above, in some implementations, can be used to classify files using additional or supplemental information about the file in addition to the output of a neural network. For example, information about source of the file, an author associated with the file, the type of file, a history of the file, a length of the file, a date associated with the file, an extension associated with the file and/or the like can be used in combination with the output of a neural network to classify the file.

While various embodiments have been described above, it should be understood that they have been presented by way of example only, and not limitation. Where methods and/or schematics described above indicate certain events and/or flow patterns occurring in certain order, the ordering of certain events and/or flow patterns can be modified. While the embodiments have been particularly shown and described, it will be understood that various changes in form and details can be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

In this disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or example language ("e.g.," "such as," "including," or the like) provided herein, is intended merely to better illuminate the embodiments and does not pose a limitation on the scope of the embodiments or the claims.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory; and
a processor operatively coupled to the memory, the processor configured to:
  train, at a first time, a machine learning model to output (1) an identification of whether an artifact is malicious and (2) a confidence value associated with the identification of whether the artifact is malicious;
  receive a set of artifacts during each time period from a set of time periods, each time period from the set of time periods being after the first time;

for each time period from the set of time periods, provide a feature vector representative of each artifact from the set of artifacts received during that time period to the machine learning model to obtain as an output of the machine learning model an indication of whether that artifact is malicious and a confidence value associated with the indication of whether that artifact is malicious based on a degree of similarity of the feature vector with a set of feature vectors representative of a set of training artifacts used to train the machine learning model at the first time;

calculate a confidence metric for each time period from the set of time periods based on the confidence value associated with a number of artifacts from the set of artifacts received during that time period meeting a confidence value threshold;

calculate a rate of change in confidence based on the confidence metric for at least two time periods from the set of time periods;

in response to the rate of change in confidence meeting a retraining criterion:
  receive, over a network and at a second time after the first time, an updated set of training artifacts; and
  retrain, based on the updated set of training artifacts, the machine learning model.

2. The apparatus of claim 1, wherein each time period from the set of time periods overlaps at least one remaining time period from the set of time periods.

3. The apparatus of claim 1, wherein each time period from the set of time periods is mutually exclusive of remaining time periods from the set of time periods.

4. The apparatus of claim 1, wherein the machine learning model is at least one of a neural network, a decision tree or a random forest.

5. The apparatus of claim 1, wherein the confidence metric for each time period from the set of time periods is a percentage associated with (1) the number of artifacts from the set of artifacts received during that time period that have a confidence value above the confidence value threshold and (2) a total number of artifacts from the set of artifacts received during that time period.

6. A method, comprising:
  training, at a first time, a machine learning model to output (1) an identification of whether an artifact is malicious and (2) a confidence value associated with the identification of whether the artifact is malicious;
  receiving, during a first time period after the first time, a set of artifacts;
  for each artifact from the set of artifacts, providing a feature vector representative of that artifact as an input to the machine learning model to obtain as an output of the machine learning model an indication of whether that artifact is malicious and a confidence value associated with the indication of whether that artifact is malicious based on a degree of similarity of the feature vector with a set of feature vectors representative of a set of training artifacts used to train the machine learning model at the first time;
  comparing the confidence value for each artifact from the set of artifacts to a confidence criterion to identify a first metric associated with a first number of artifacts having confidence values that do not meet the confidence criterion; and
  in response to a rate of change between the first metric and a second metric meeting a retraining criterion:
    receiving, over a network and at a second time after the first time, an updated set of training artifacts; and
    retraining, based on the updated set of training artifacts, the machine learning model;
  the second metric associated with a second number of artifacts including artifacts (1) from a set of artifacts received during a second time period after the first time period and (2) having confidence values not meeting the confidence criterion.

7. The method of claim 6, wherein the first metric is a percentage associated with (1) the first number of artifacts and (2) a total number of artifacts received during the first time period.

8. The method of claim 6, wherein the machine learning model is at least one of a neural network, a decision tree or a random forest.

9. The apparatus of claim 1, wherein the confidence value threshold includes a high confidence criterion and a low confidence criterion, the processor is further configured to:
  compare the confidence value for each artifact from the set of artifacts, for a time period from the set of time periods, to the high confidence criterion to identify a number of artifacts having confidence values that meet the high confidence criterion; and
  compare the confidence value for each artifact from the set of artifacts, for a time period from the set of time periods, to the low confidence criterion to identify a number of artifacts having confidence values that meet the low confidence criterion;
  the confidence metric for that time period from the set of time periods being based on at least one of (1) the number of artifacts having confidence values that meet the high confidence criterion from the set of artifacts received during that time period, or (2) the number of artifacts having confidence values that meet the low confidence criterion from the set of artifacts received during that time period.

10. The apparatus of claim 9, wherein the confidence metric is based on the number of artifacts, from the set of artifacts received during that time period, having confidence values that meet the high confidence criterion.

11. The apparatus of claim 9, wherein the confidence metric is based on the number of artifacts, from the set of artifacts received during that time period, having confidence values that meet the low confidence criterion.

12. The apparatus of claim 1, wherein the degree of similarity is defined by a Euclidean distance between the feature vector of each artifact from the set of artifacts received during that time period and the set of feature vectors of the set of training artifacts used to train the machine learning model at the first time.

13. The method of claim 6, wherein the degree of similarity is defined by a Euclidean distance between the feature vector of each artifact from the set of artifacts received during the first time period and the set of feature vectors of the set of training artifacts used to train the machine learning model at the first time.

14. The method of claim 6, wherein the first metric is at least one of a median of the first number of artifacts or a standard deviation of the first number of artifacts.

\* \* \* \* \*